United States Patent
Xu et al.

(10) Patent No.: US 9,366,106 B2
(45) Date of Patent: *Jun. 14, 2016

(54) METHOD OF MAKING AND USING A FUNCTIONALLY GRADIENT COMPOSITE TOOL

(71) Applicants: Zhiyue Xu, Cypress, TX (US); Michael Johnson, Katy, TX (US)

(72) Inventors: Zhiyue Xu, Cypress, TX (US); Michael Johnson, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/158,055

(22) Filed: Jan. 17, 2014

(65) Prior Publication Data

US 2014/0131050 A1      May 15, 2014

Related U.S. Application Data

(63) Continuation of application No. 13/096,442, filed on Apr. 28, 2011, now Pat. No. 8,631,876.

(51) Int. Cl.
*E21B 34/06* (2006.01)
*E21B 33/12* (2006.01)
*E21B 23/00* (2006.01)
(Continued)

(52) U.S. Cl.
CPC . *E21B 33/12* (2013.01); *B05D 7/14* (2013.01); *B22F 7/02* (2013.01); *B22F 7/06* (2013.01); *E21B 17/00* (2013.01); *E21B 23/00* (2013.01); *E21B 29/00* (2013.01); *E21B 34/06* (2013.01); *B22F 2207/00* (2013.01); *Y10T 29/49826* (2015.01)

(58) Field of Classification Search
CPC .................................. E21B 33/12; E21B 41/00
See application file for complete search history.

(56) References Cited

U.S. PATENT DOCUMENTS

| 1,468,905 A | 9/1923 | Herman |
| 2,189,697 A | 2/1940 | Baker |

(Continued)

FOREIGN PATENT DOCUMENTS

WO     2011130063 A3     2/2012

OTHER PUBLICATIONS

"Baker Hughes Refines Expandable Tubular Technology with Abaqus and Isight", Simulia Realistic Simulation News, Jan./Feb. 2011, pp. 12-13.

(Continued)

*Primary Examiner* — William P Neuder
(74) *Attorney, Agent, or Firm* — Cantor Colburn LLP

(57) ABSTRACT

A method of making a composite downhole article is disclosed. The method include forming at least one removable core member comprising a first metallic material that is removable in a wellbore fluid at a first removal rate; and disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate. A method of using a composite downhole article is also disclosed. The method includes forming a composite downhole article as described above; using the article to perform a first wellbore operation; exposing the article to the wellbore fluid; and selectively removing the second removable member.

61 Claims, 9 Drawing Sheets

(51) Int. Cl.
  *E21B 29/00* (2006.01)
  *B22F 7/06* (2006.01)
  *B05D 7/14* (2006.01)
  *B22F 7/02* (2006.01)
  *E21B 17/00* (2006.01)

(56) References Cited

U.S. PATENT DOCUMENTS

| | | | |
|---|---|---|---|
| 2,222,233 | A | 11/1940 | Mize |
| 2,225,143 | A | 12/1940 | Baker et al. |
| 2,672,199 | A | 3/1948 | McKenna |
| 2,753,941 | A | 7/1956 | Hebard et al. |
| 2,933,136 | A | 4/1960 | Ayers et al. |
| 3,142,338 | A | 7/1964 | Brown |
| 3,602,305 | A | 8/1971 | Kisling |
| 4,284,137 | A | 8/1981 | Taylor |
| 4,292,377 | A | 9/1981 | Petersen et al. |
| 4,524,825 | A | 6/1985 | Fore |
| 4,719,971 | A | 1/1988 | Owens |
| 4,880,059 | A | 11/1989 | Brandell et al. |
| 4,901,794 | A | 2/1990 | Baugh et al. |
| 5,352,522 | A | 10/1994 | Kugimiya et al. |
| 5,511,620 | A | 4/1996 | Baugh et al. |
| 5,988,287 | A | 11/1999 | Jordan, Jr. et al. |
| 6,176,323 | B1 | 1/2001 | Weirich et al. |
| 6,354,372 | B1 | 3/2002 | Carisella et al. |
| 6,394,180 | B1 | 5/2002 | Berscheidt et al. |
| 6,446,717 | B1 | 9/2002 | White et al. |
| 6,513,600 | B2 | 2/2003 | Ross |
| 6,712,153 | B2 | 3/2004 | Turley et al. |
| 6,712,797 | B1 | 3/2004 | Southern, Jr. |
| 6,769,491 | B2 | 8/2004 | Zimmerman et al. |
| 7,128,145 | B2 | 10/2006 | Mickey |
| 7,165,622 | B2 | 1/2007 | Hirth et al. |
| 7,373,978 | B2 | 5/2008 | Barry et al. |
| 7,607,476 | B2 | 10/2009 | Tom et al. |
| 7,743,836 | B2 | 6/2010 | Cook et al. |
| 8,459,347 | B2 | 6/2013 | Stout |
| 8,490,689 | B1 | 7/2013 | McClinton et al. |
| 8,573,295 | B2 | 11/2013 | Johnson |
| 8,631,876 | B2 * | 1/2014 | Xu .................... B22F 7/06 166/192 |
| 9,080,098 | B2 * | 7/2015 | Xu .................... E21B 41/00 |
| 2001/0040180 | A1 | 11/2001 | Wittebrood et al. |
| 2002/0092654 | A1 | 7/2002 | Coronado et al. |
| 2002/0096365 | A1 | 7/2002 | Berscheidt et al. |
| 2002/0108756 | A1 | 8/2002 | Harrall et al. |
| 2002/0139541 | A1 | 10/2002 | Sheffield et al. |
| 2003/0019639 | A1 | 1/2003 | Mackay |
| 2003/0226668 | A1 | 12/2003 | Zimmerman et al. |
| 2004/0159446 | A1 | 8/2004 | Haugen et al. |
| 2004/0216868 | A1 | 11/2004 | Owen, Sr. |
| 2004/0251025 | A1 | 12/2004 | Giroux et al. |
| 2004/0261994 | A1 | 12/2004 | Nguyen et al. |
| 2005/0098313 | A1 | 5/2005 | Atkins et al. |
| 2005/0275143 | A1 | 12/2005 | Toth |
| 2006/0153728 | A1 | 7/2006 | Schoenung et al. |
| 2006/0186602 | A1 | 8/2006 | Martin et al. |
| 2007/0039161 | A1 | 2/2007 | Garcia |
| 2007/0227745 | A1 | 10/2007 | Roberts et al. |
| 2008/0093073 | A1 | 4/2008 | Bustos et al. |
| 2008/0169130 | A1 | 7/2008 | Norman et al. |
| 2008/0236842 | A1 | 10/2008 | Bhavsar et al. |
| 2008/0302538 | A1 | 12/2008 | Hofman |
| 2009/0126436 | A1 | 5/2009 | Fly et al. |
| 2009/0139720 | A1 | 6/2009 | Frazier |
| 2009/0211770 | A1 | 8/2009 | Nutley et al. |
| 2010/0038076 | A1 | 2/2010 | Spray et al. |
| 2010/0116495 | A1 | 5/2010 | Spray |
| 2010/0276159 | A1 | 11/2010 | Mailand et al. |
| 2010/0294510 | A1 * | 11/2010 | Holmes ............... E21B 41/00 166/376 |
| 2010/0326650 | A1 | 12/2010 | Tran et al. |
| 2011/0135953 | A1 | 6/2011 | Xu et al. |
| 2011/0314881 | A1 | 12/2011 | Hatcher et al. |
| 2012/0090839 | A1 | 4/2012 | Rudic |
| 2012/0145378 | A1 | 6/2012 | Frazier |
| 2012/0205872 | A1 | 8/2012 | Reinhardt et al. |
| 2012/0234546 | A1 | 9/2012 | Xu |
| 2012/0234547 | A1 | 9/2012 | O'Malley et al. |
| 2013/0008671 | A1 | 1/2013 | Booth et al. |
| 2013/0048305 | A1 | 2/2013 | Xu et al. |
| 2013/0240200 | A1 | 9/2013 | Frazier |
| 2013/0299185 | A1 | 11/2013 | Xu et al. |
| 2013/0299192 | A1 | 11/2013 | Xu et al. |
| 2013/0300066 | A1 | 11/2013 | Xu et al. |
| 2013/0319668 | A1 | 12/2013 | Tschetter et al. |
| 2014/0027128 | A1 | 1/2014 | Johnson |
| 2014/0060834 | A1 | 3/2014 | Quintero et al. |
| 2014/0262327 | A1 | 9/2014 | Xu et al. |
| 2014/0360728 | A1 | 12/2014 | Tashiro et al. |

OTHER PUBLICATIONS

Australian Examination Report; Australian Application No. 2012287461; Date of Mailing: Jul. 13, 2015; 6 pages.
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 pages.
Canadian Office Action for Canadian Application No. 2,844,517, dated May 26, 2015, pp. 1-4.
Chinese Office Action for Chinese Application No. 201280036477.4, dated Nov. 4, 2015, pp. 1-15.
Triolo et al., "Resolving the Completion Engineer's Dilemma: Permanent or Retrievable Packer?"; Society of Petroleum Engineers, SPE Paper No. 76711; May 20, 2002; 16 pages.
Chinese Office Action; Chinese Application No. 201280020572.5; Mailing Date:Oct. 10, 2015; 13 pages.
Chuan-Jun et al., "Study on Corrosion Kinetics of Mg—Ni alloys", Journal of Kunming University of Science and Technology, vol. 34, No. 5, pp. 10-13, Oct. 2009.
Coronado, "Development of an Internal Coiled Tubing Connector Utilizing Permanent Packer Technology"; Society of Petroleum Engineers, SPE Paper No. 46036; Apr. 15, 1998; 10 pages.
European Search Report for EP Application No. 10836533.9 dated Jul. 27, 2015.
European Search Report for EP Application No. 10836538.8 dated Jul. 27, 2015.
European Search Report for EP Application No. 10836539.6 dated Jul. 27, 2015.
Feng, et al., "Electroless Plating of Carbon Nanotubes with Silver" Journal of Materials Science, 39, (2004) pp. 3241-3243.
Garfield, "Formation Damage Control Utilizing Composite-Bridge-Plug Technology for Monobore, Multizone Stimulation Operations," SPE 70004, 2001, Society of Petroleum Engineers Inc., This paper was prepared for presentation at the SPE Per.
Hsiao, et al., "Anodization of AZ91D Magnesium Alloy in Silicate-Containing Electrolytes"; Surface & Coatings Technology; 199; pp. 127-134; (2005).
Hsiao, et al., "Characterization of Anodic Films Formed on AZ91D Magnesium Alloy"; Surface & Coatings Technology; 190; pp. 299-308; (2005).
International Search Report and Written Opinion; International Application No. PCT/US2013/020046; International Filing Date: Jan. 3, 2013; Date of Mailing: Apr. 10, 2013; 7 pages.
International Search Report and Written Opinion; International Application No. PCT/US2013/050475; International Filing Date: Jul. 15, 2013; Date of Mailing: Oct. 10, 2013; 12 pages.
International Search Report and Written Opinion; International Application No. PCT/US2014/010862; International Filing Date: Jan. 9, 2014; Date of Mailing: Apr. 21, 2014; 9 pages.
International Search Report for related PCT Application No. PCT/US2013/035258, dated Jul. 4, 2013, pp. 1-4.
International Search Report for related PCT Application No. PCT/US2013/035261, dated Jul. 10, 2013, pp. 1-4.
International Search Report for related PCT Application No. PCT/US2013/035262, dated Jul. 1, 2013, pp. 1-4.

(56) References Cited

OTHER PUBLICATIONS

International Search Report for related PCT Application No. PCT/US2013/068062, dated Feb. 12, 2014, pp. 1-3.
Kuzumaki, et al.; "Mechanical Characteristics and Preparation of Carbon Nanotube Fiber-Reinforced Ti Composite", Advanced Engineering Materials, 2000, 2, No. 7.
Lee, et al., "Effects of Ni addition on hydrogen storage properties of Mg17AL12 alloy", Materials Chemistry and Physics, 2011, 126, pp. 319-324.
Li, et al. "Investigation of aluminium-based nancompsoites with ultra-high strength", Materials Science and Engineering A, 527, pp. 305-316, (2009).
Liu, et al., "Calculated Phase Diagrams and the Corrosion of Die-Cast Mg—Al Alloys", Corrosion Science, 2009, 51, 506-619.
Liu, et al.; "Electroless Nickel Plating on AZ91 Mg Alloy Substrate"; Surface & Coatings Technology; 200; pp. 5087-5093; (2006).
Majumdar, et al., "Laser Surface Engineering of a Magnesium Alloy with Al + Al2O3", Surface and Coatings Technology 179 (2004) pp. 297-305.
Mathis, "Sand Management: A Review of Approaches and Concerns", Society of Petroleum Engineers, SPE Paper No. 82240, SPE European Formation Damage Conference, The Hague, The Netherlands, May 13-14, 2003.
Murray, "Binary Alloy Phase Diagrams" Int. Met. Rev., 30(5) 1985 vol. 1, pp. 103-187.
Nie, "Patents of Methods to Prepare Intermetallic Matrix Composites: A Review", Recent Patents on Materials Science 2008, vol. 1, pp. 232-240.
Pardo, et al.; "Corrosion Behaviour of Magnesium/Aluminium Alloys in 3.5 wt% NaCl"; Corrosion Science; 50; pp. 823-834; (2008).
Quik Drill Composite Frac Plug; Baker Hughes, Baker Oil Tools; Copyright 2002; 3 pages.
Song, "Recent Progress in Corrosion and Protection of Magnesium Alloys"; Advanced Engineering Materials; 7(7); pp. 563-586; (2005).
Song, et al.; "A Possible Biodegradable Magnesium Implant Material," Advanced Engineering Materials, vol. 9, Issue 4, Apr. 2007, pp. 298-302.
Song, et al.; "Corrosion Behaviour of AZ21, AZ501 and AZ91 in Sodium Chloride"; Corrosion Science; 40(10); pp. 1769-1791; (1998).
Song, et al.; "Corrosion Mechanisms of Magnesium Alloys"; Advanced Engineering Materials; 1(1); pp. 11-33; (1999).
Song, et al.; "Influence of Microstructure on the Corrosion of Diecast AZ91D"; Corrosion Science; 41; pp. 249-273; (1999).
Song, et al.; "Understanding Magnesium Corrosion"; Advanced Engineering Materials; 5; No. 12; pp. 837-858; (2003).

\* cited by examiner

METHOD OF MAKING AND USING A FUNCTIONALLY GRADIENT COMPOSITE TOOL

CROSS-REFERENCES TO RELATED APPLICATIONS

This patent application claims priority to U.S. patent application Ser. No. 13/096,442, filed Apr. 28, 2011, which is incorporated herein by reference in its entirety. This application contains subject matter related to the subject matter of co-pending patent application U.S. Ser. No. 13/096,413, filed Apr. 28, 2011, which is incorporated herein by reference in its entirety.

BACKGROUND

Downhole drilling, completion and production operations often utilize wellbore components or tools that, due to their function, are only required to have limited service lives and must be removed from or disposed of in the wellbore in order to recover the original size of the fluid pathway for use, including hydrocarbon production, $CO_2$ sequestration, etc. Disposal of components or tools has conventionally been done by milling or drilling the component or tool out of the wellbore, which are generally time consuming and expensive operations.

The removal of components or tools by dissolution of degradable polylactic polymers using various wellbore fluids has been proposed. However, these polymers generally do not have the mechanical strength, fracture toughness and other mechanical properties necessary to perform the functions of wellbore components or tools over the operating temperature range of the wellbore, therefore, their application has been limited.

Other degradable materials have been proposed including certain degradable metal alloys formed from certain reactive metals in a major portion, such as aluminum, together with other alloy constituents in a minor portion, such as gallium, indium, bismuth, tin and mixtures and combinations thereof, and without excluding certain secondary alloying elements, such as zinc, copper, silver, cadmium, lead, and mixtures and combinations thereof. These materials may be formed by melting powders of the constituents and then solidifying the melt to form the alloy, or using powder metallurgy by pressing, compacting, sintering and the like a powder mixture of a reactive metal and other alloy constituent in the amounts mentioned. These materials include many combinations that utilize heavy metals, such as lead, cadmium, and the like that may not be suitable for release into the environment in conjunction with the degradation of the material. Also, their formation may involve various melting phenomena that result in alloy structures that are dictated by the phase equilibria and solidification characteristics of the respective alloy constituents, and that may not result in optimal or desirable alloy microstructures, mechanical properties or dissolution characteristics.

Therefore, the development of materials that can be used to form wellbore components and tools having the mechanical properties necessary to perform their intended function and then removed from the wellbore by controlled dissolution using wellbore fluids is very desirable.

SUMMARY

In an exemplary embodiment, a method of making a composite downhole article is disclosed. The method includes forming at least one removable core member comprising a first metallic material that is removable in a wellbore fluid at a first removal rate. The method also includes disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate.

In another exemplary embodiment, a method of making a composite downhole article is disclosed. The method includes forming at least one core member comprising a first material that is removable in a wellbore fluid at a first removal rate. The method also includes disposing at least one removable outer member on the core member and comprising a second material that is removable in the wellbore fluid at a second removal rate, wherein the removable outer member has a composition gradient or a density gradient, or a combination thereof, and wherein at least one of the first material and the second material comprises a metallic material, and wherein the second removal rate is substantially greater than the first removal rate.

In another exemplary embodiment, a method of making a composite downhole article is disclosed. The method includes forming a first member comprising a first material that is removable in a wellbore fluid at a first removal rate. The method also includes disposing a second removable member on the first member, the second removable member comprising a second material that is removable in the wellbore fluid at a second removal rate, the second material comprising a powder compact that comprises a plurality of metallic coated powder particles, wherein the second removal rate is substantially greater than the first removal rate.

In yet another exemplary embodiment, a method of using a composite downhole article is disclosed. The method includes forming a composite downhole article that comprises a first member comprising a first material that is removable in a wellbore fluid at a first removal rate and a second removable member disposed on the first member, the second removable member comprising a second material that is removable in the wellbore fluid at a second removal rate, the second material comprising a powder compact that comprises a plurality of metallic coated powder particles, wherein the second removal rate is substantially greater than the first removal rate. The method also includes using the article to perform a first wellbore operation. The method further includes exposing the article to the wellbore fluid. The method further includes selectively removing the second removable member.

BRIEF DESCRIPTION OF THE DRAWINGS

Referring now to the drawings wherein like elements are numbered alike in the several Figures.

DETAILED DESCRIPTION

Figure 1:
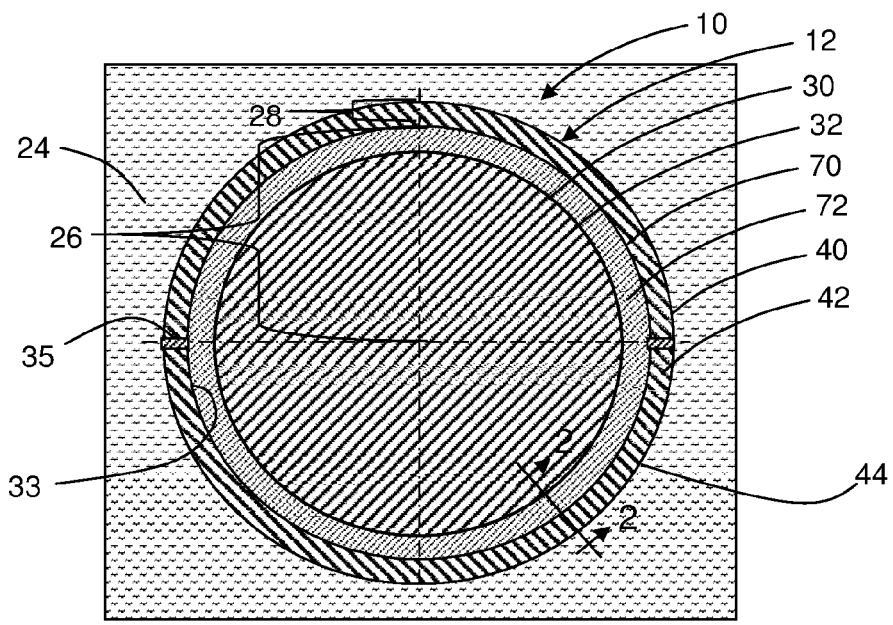
FIG. 1 is a cross-sectional view of an exemplary embodiment of a downhole article as disclosed herein.

Referring to the FIGS. 1-12, a composite downhole article 10 is disclosed. The composite downhole article 10 may include any one of various downhole tools and components. These downhole tools and components may include various diverter balls 12, ball seats 14, plugs 16, plug seats 18, disks 20, darts 21, sleeves 22, tubular sections 23 and the like. The composite downhole article 10 is selectively corrodible in a predetermined wellbore fluid 24. The composite downhole articles 10 may be selectively removed using the predetermined wellbore fluid 24. Alternately, they may be reconfigured from one shape to another shape or one size to another size using the predetermined wellbore fluid 24 to selectively corrode a portion of the article 10. Combinations of these features are also possible, such as, for example, reconfiguration of the article from one shape to another shape or one size to another size followed by removing the article 10 from the wellbore using the predetermined wellbore fluid 24, or a combination of predetermined wellbore fluids 24. The composite downhole articles 10 described herein include a functionally gradient composite material that includes a rapidly corrodible metallic portion 26 and a more corrosion resistant portion 28 that is corrodible at a much slower rate in the predetermined wellbore fluid 24. In certain embodiments, the composite downhole article 10 may include a tough, selectively and rapidly corrodible metallic core member 30 or substrate comprising a first material 32 that comprises the corrodible metallic portion 26 and that is protected by hard and corrosion resistant outer member 40 comprising a second material 42 that comprises the more corrosion resistant portion 28. In other embodiments, the arrangement may be reversed and the composite downhole article 10 may include a tough, selectively and rapidly corrodible metallic outer member 50 or substrate comprising the first material 32 that comprises the corrodible metallic portion 26 that encompasses a hard and corrosion resistant core member 60 comprising a second material 42 that comprises the more corrosion resistant portion 28. The corrodible metallic portion 26 may include a functionally gradient portion 70 that includes a functionally gradient material 70 disposed between the first material 32 of corrodible metallic portion 26 and the second material 42 of more corrosion resistant portion 28. Such a structure enables the tool to resist corrosion during use of the article, such as tool operation, while also allowing rapid reconfiguration or removal when the core material is exposed to the predetermined wellbore fluid. The gradient portion 70 may be used, for example, to provide a microstructural transition between the first material 32 and the second material 42, since these materials may have substantially different metallurgical and mechanical properties. The corrodible metallic portion 26 may be formed from a nanomatrix composite material as disclosed herein. The relatively more corrosion resistant portion 28 may be formed from any suitable material that is more corrosion resistant than the corrodible metallic portion 26, preferably substantially more corrosion resistant, and more particularly may include materials that exhibit high hardness and wear resistance, for example.

Referring to FIG. 1, in an exemplary embodiment, the composite downhole article includes, at least one corrodible core member 30 comprising a first material 32 that is corrodible in a wellbore fluid at a first corrosion rate. The composite downhole article 10 also includes at least one outer member 40 disposed on the core member 30 and comprising a second material 42 that is corrodible in the wellbore fluid at a second corrosion rate, wherein the corrodible core member 30 has a gradient portion 70 that includes a composition gradient or a density gradient, or a combination thereof, and wherein the first corrosion rate is substantially greater than the second corrosion rate.

The outer member 40 may have any suitable form or thickness. In one embodiment, the outer member 40 comprises a layer that is disposed on the core member 30 by direct deposition of the second material 42 on an outer portion or surface 36 of the gradient portion 70 of the core member 30 or alternately, on an outer portion or surface of a separately formed gradient portion 70 that is disposed on the core member 30. Various deposition methods may be employed, such as plating, sputtering and other thin film deposition techniques, cladding, compacting a powder, thermal spraying, or laser fusion of a powder as described herein. The outer member 40 may also be formed as a separate member and attached to the outer portion 36 of the core member 30 by any suitable attachment method including those described herein. For example, the outer member 40 may be formed as a powder compact including as a nanomatrix powder compact as described herein and then attached to the outer portion of the core member 30 by a suitable attachment method. Suitable attachment methods include isostatic pressing, diffusion bonding, thermal molding, welding, brazing, adhesives and the like. The outer member 40 may also be formed in one or more portions or sections which are attached to one another so as to encompass the core member 30, either with or without direct attachment to the core member 30. In an exemplary embodiment, outer member 40 may be formed as two thin hemispherical halves that may be placed around a substantially spherical core member 30 such that the hemispherical halves 33 press against the core member 40 followed by, for example, joining the hemispheres by a joint, such as a weld joint 35, around their adjoining peripheries so as to encompass the core member 30. The outer member 40 may have any suitable thickness necessary to perform the wellbore operation or operations of the article 10 with which it is associated. In an exemplary embodiment, the outer member 40 includes a relatively thin layer disposed on the core member 30, and more particularly may have a thickness of up to about 10 mm, and more particularly about 1 mm to about 5 mm, and even more particularly about 0.1 mm to about 2 mm. The outer member may also comprise a deposited thin film, and may have a thickness that is 500 microns or less, and more particularly 100 microns or less, and even more particularly 10 microns or less.

Figure 4:
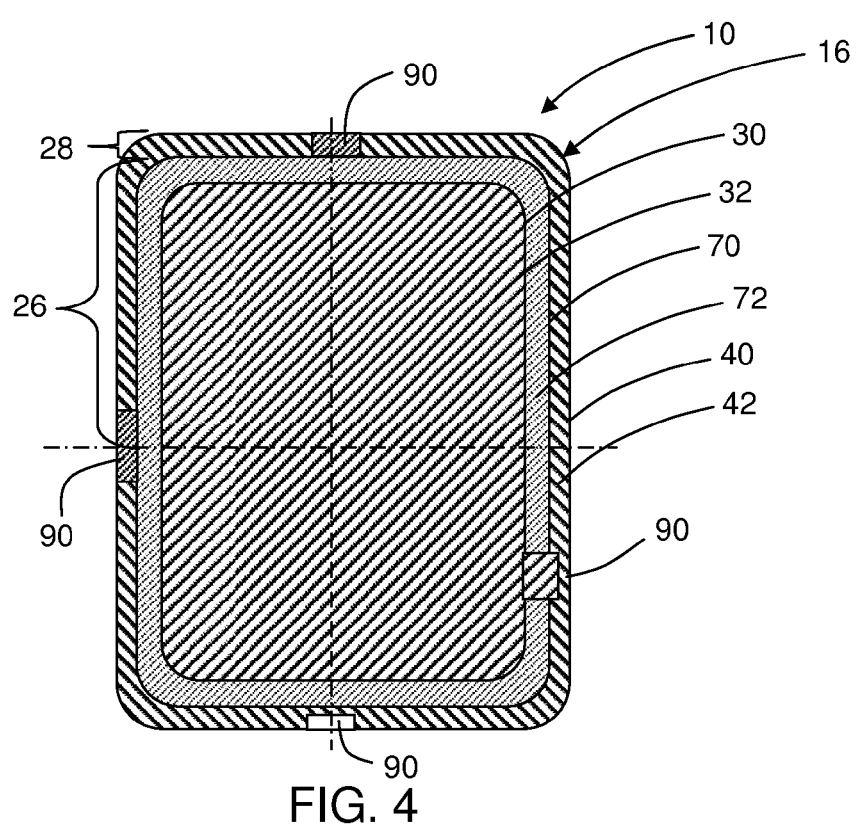
FIG. 4 is a cross-sectional view of a second exemplary embodiment of a downhole article as disclosed herein.
Figure 5:
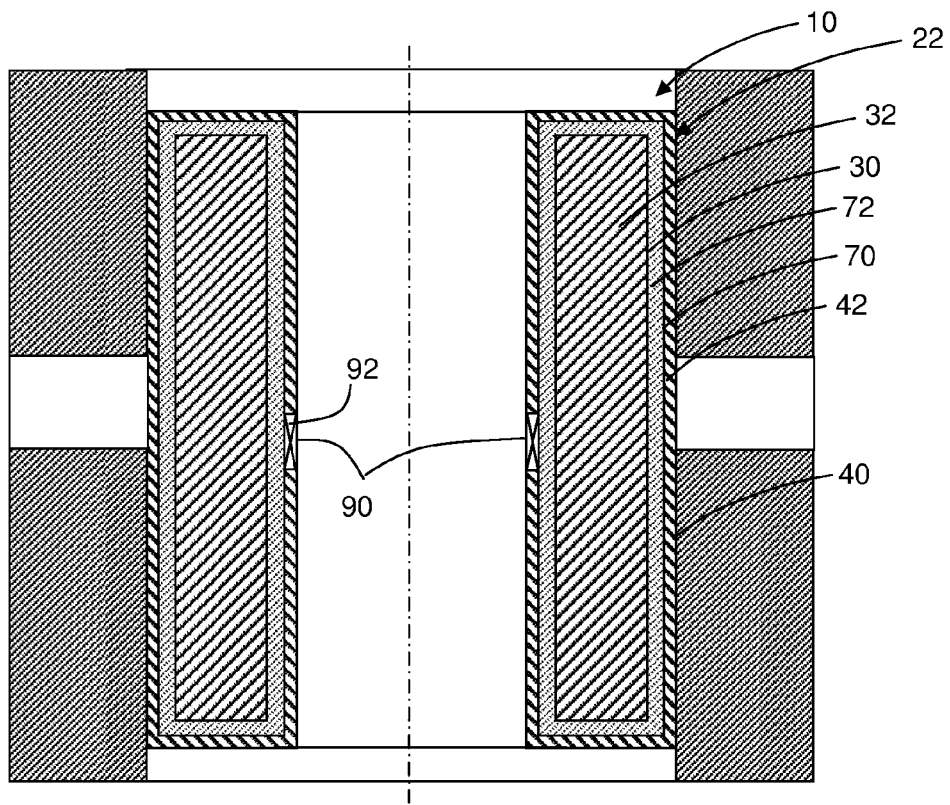
FIG. 5 is a cross-sectional view of a third exemplary embodiment of a downhole article as disclosed herein.
Figure 6:
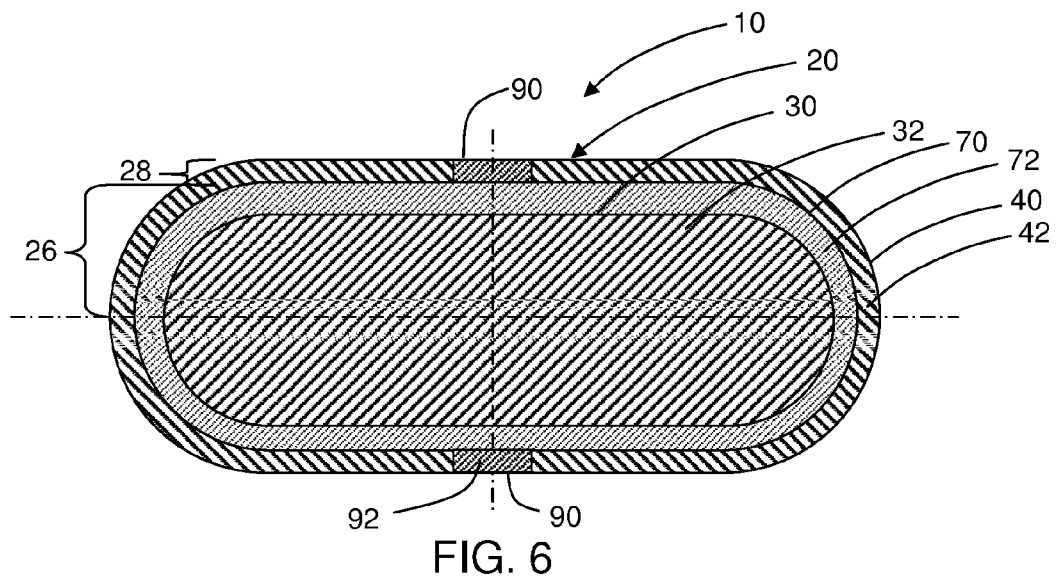
FIG. 6 is a cross-sectional view of a fourth exemplary embodiment of a downhole article as disclosed herein.
Figure 7:
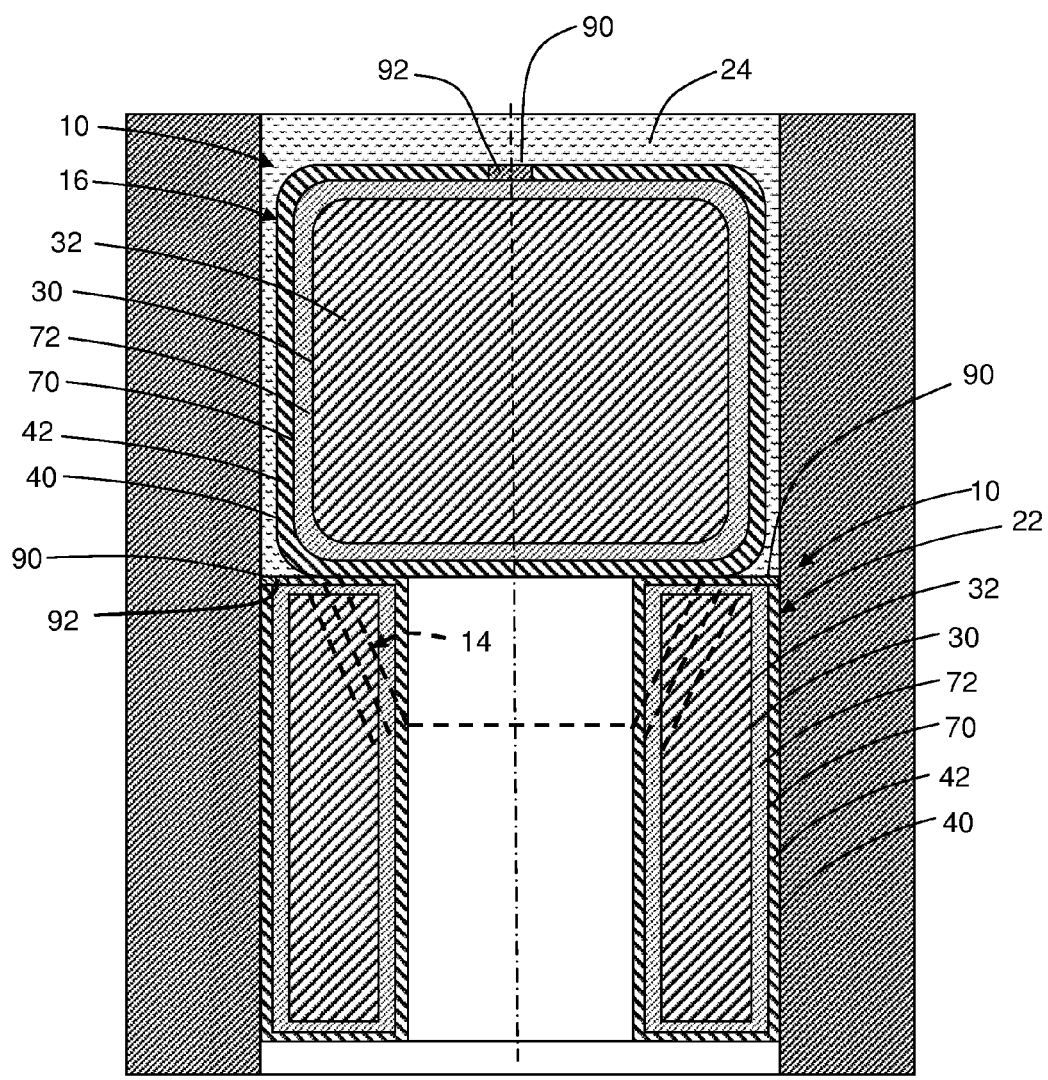
FIG. 7 is a cross-sectional view of a fifth exemplary embodiment of a downhole article as disclosed herein.
Figure 8:
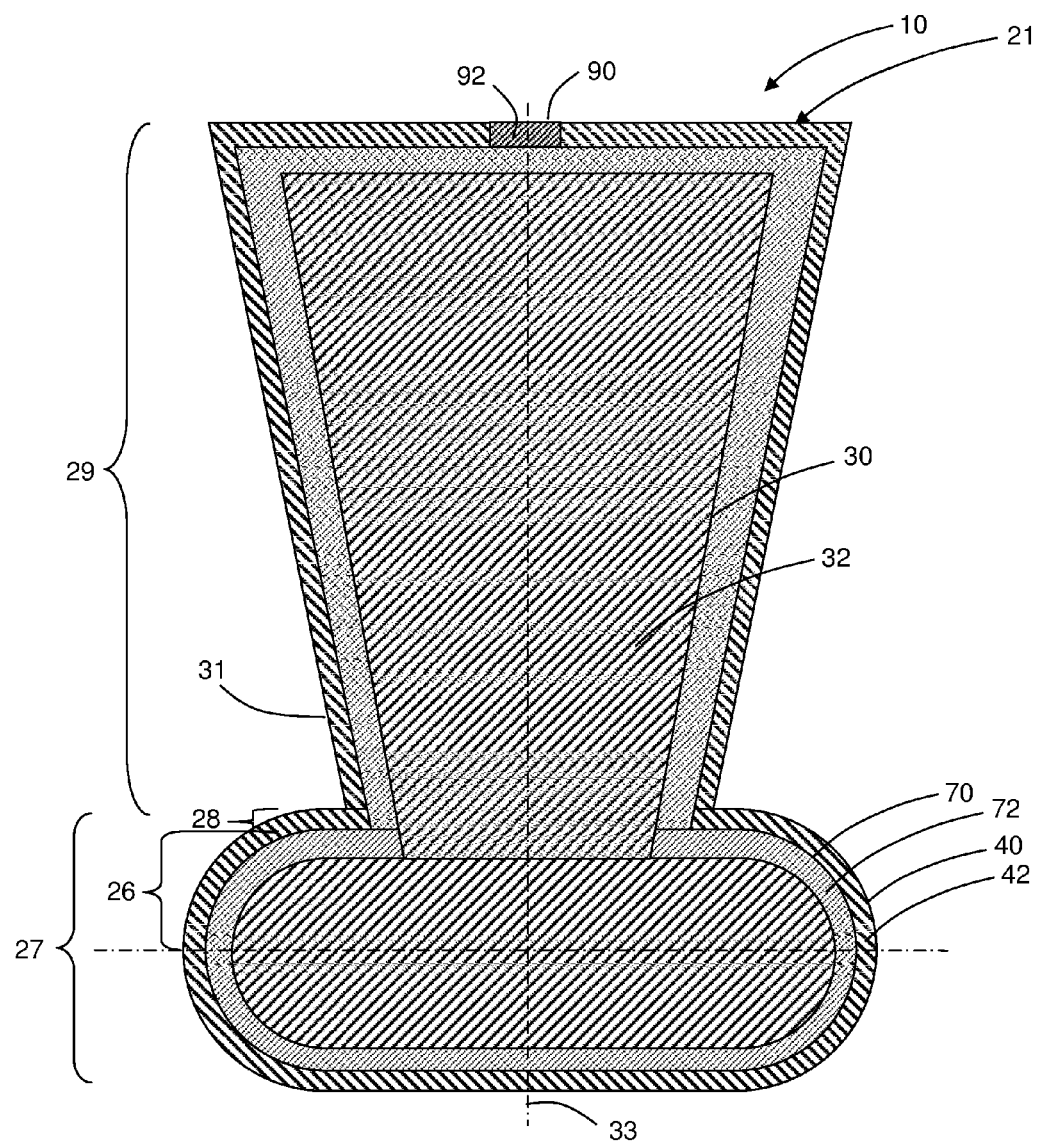
FIG. 8 is a cross-sectional view of a sixth exemplary embodiment of a downhole article as disclosed herein.
Figure 9:
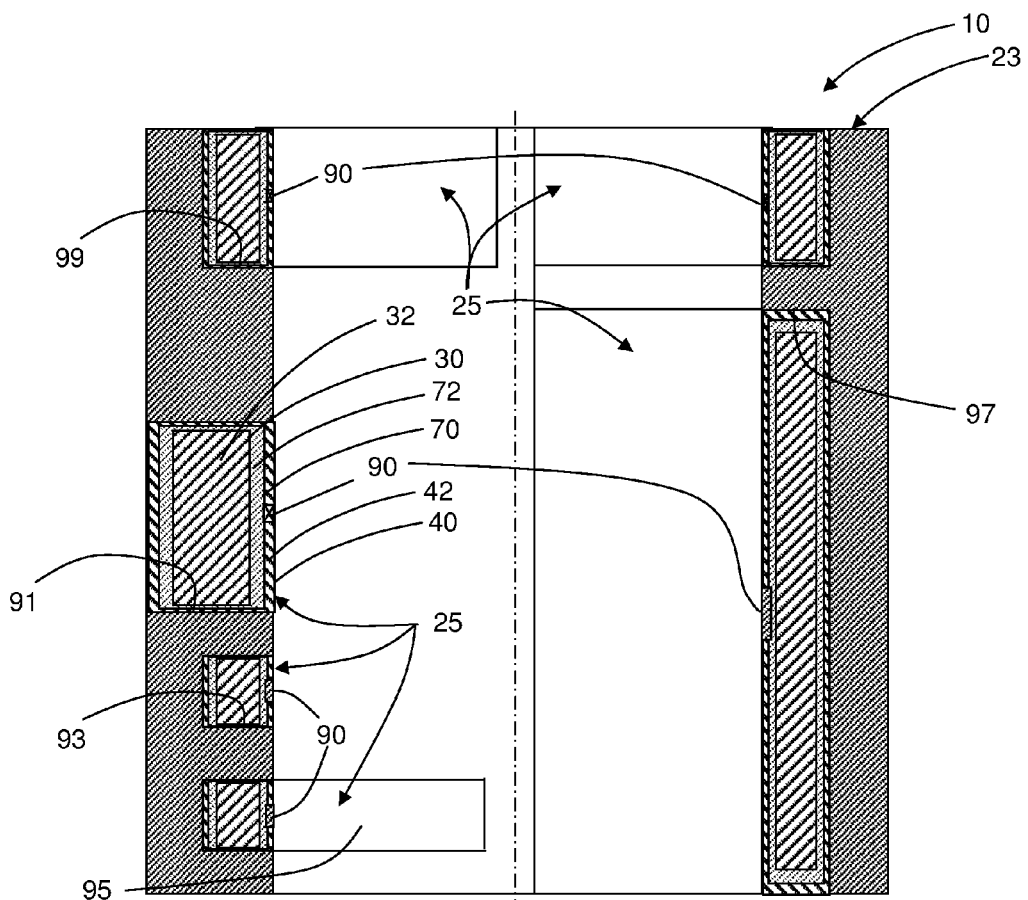
FIG. 9 is a cross-sectional view of a seventh exemplary embodiment of a downhole article as disclosed herein.
Figure 11:
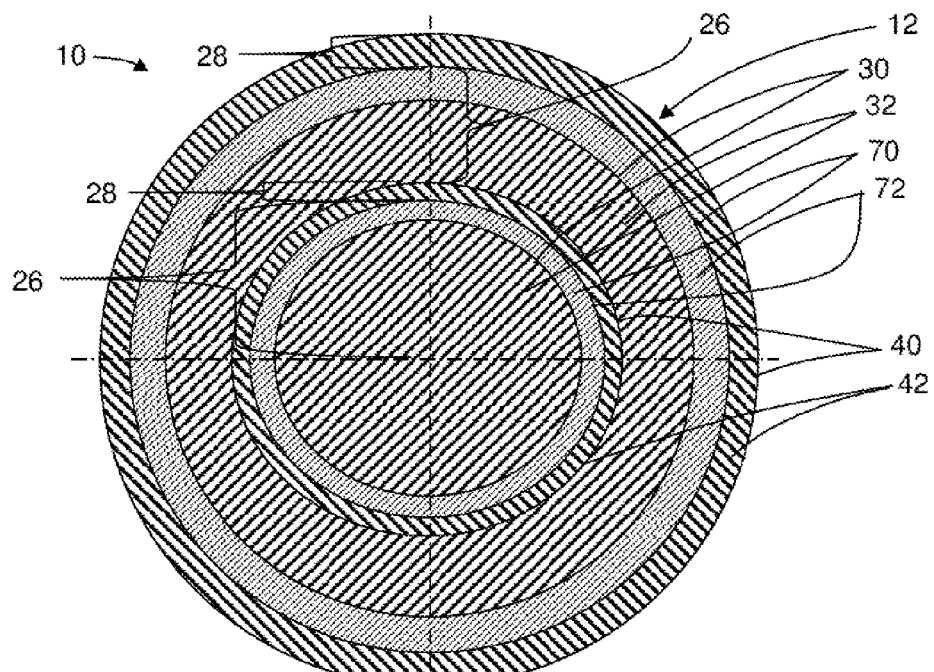
FIG. 11 is a cross-sectional view of a ninth exemplary embodiment of a downhole article as disclosed herein.
Figure 12:
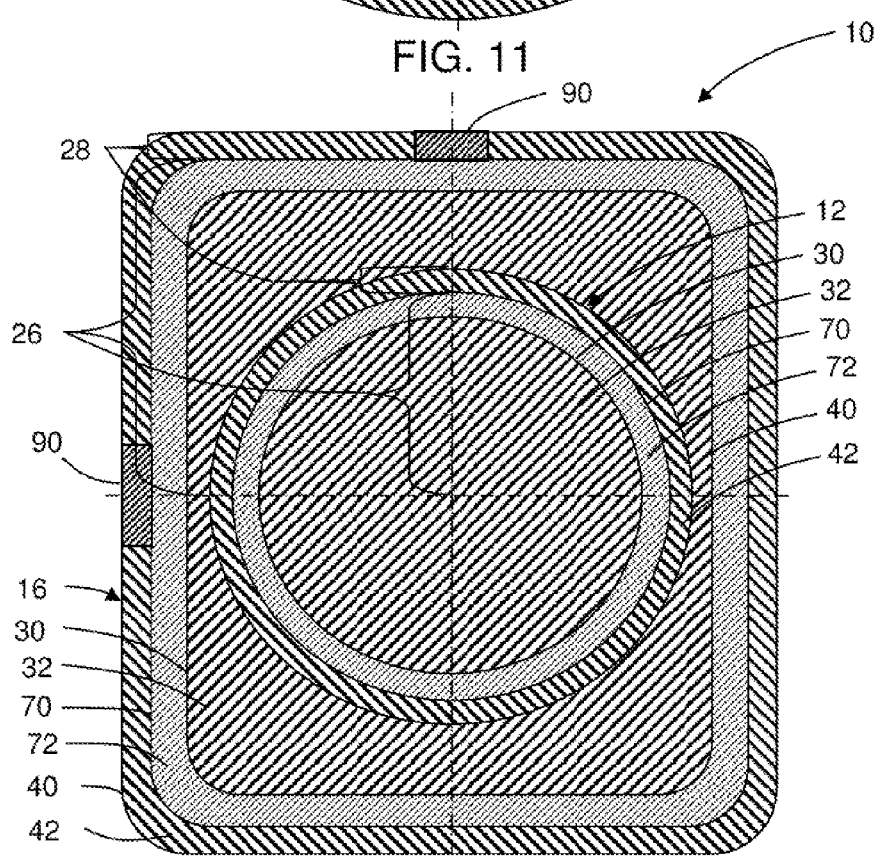
FIG. 12 is a cross-sectional view of a tenth exemplary embodiment of a downhole article as disclosed herein.

In certain embodiments, the core member 30 may be completely or partially encompassed by the outer member 40, such as examples where the outer member 40 comprises an outer layer that completely or partially encompasses the core member 30. In other embodiments, the outer member 40 may only be applied to a portion or portions of the core member 30, such as those which are exposed to the wellbore fluid 24. In one embodiment, the article 10 comprises a substantially spherical diverter ball 12 as illustrated in FIG. 1. The corrodible core member 30 is substantially spherical and the outer member 40 is a substantially spherical layer disposed on the core member as illustrated in FIG. 1 with the gradient portion 70 disposed between them. In another embodiment, the article 10 comprises a cylindrical plug 16 as illustrated in FIG. 4. The corrodible core member 30 is substantially cylindrical and the outer member 40 comprises an encompassing layer disposed on the core member 30. In yet another embodiment, the article 10 comprises a hollow cylindrical sleeve 22 as illustrated in FIG. 5. The core member 30 comprises a hollow cylinder disposed about a longitudinal axis and the outer member 40 comprises a layer disposed on the core member 30 and gradient portion 70. The 22 sleeve may also comprise a seat on one or both ends, such as a tapered ball seat 14, or a plug seat 18 as illustrated in FIG. 7. In still another embodiment, the article 10 may include a cylindrical disk 20 as illustrated in FIG. 6. The core member 30 comprises a cylindrical disk and the outer member 40 comprises a layer disposed on the core member 30 and gradient portion 70. In another embodiment, the article 10 may include a dart 21 that include a cylindrical disk portion 27 and a frustoconical tail portion 29 as illustrated in FIG. 8. The frustoconical tail portion 29 may comprise a plurality of tapered fins 31 that are radially spaced about the longitudinal axis 33. The core member 30 comprises a cylindrical disk and the outer member 40 comprises a layer disposed on the core member 30 and gradient portion 70. In still another embodiment, the article 10 may include a cylindrical tubular section 23, such as may be used to form a section of a wellbore casing as illustrated in FIG. 9. One of ordinary skill will recognize that downhole tools or components comprising the article 10 shapes described above may be use in various drilling, completion and production operations, and these forms may also include various features 25 incorporated therein, such as various holes, slots, shoulders, grooves, ribs and the like as illustrated in FIG. 9 in conjunction with a tubular section 23. These shape forms may also be nested within one another, such that a plurality of spherical balls or cylinders or sleeves as described above may be nested within one another and have progressively larger or smaller sizes. Articles 10 as disclosed herein having different shape forms mentioned herein may also be nested within one another, such as a smaller ball 12 nested within a larger ball 12 as illustrated in FIG. 11, and a smaller ball 12 nested within a larger plug 16 as illustrated in FIG. 12, or vice versa.

Figure 16:
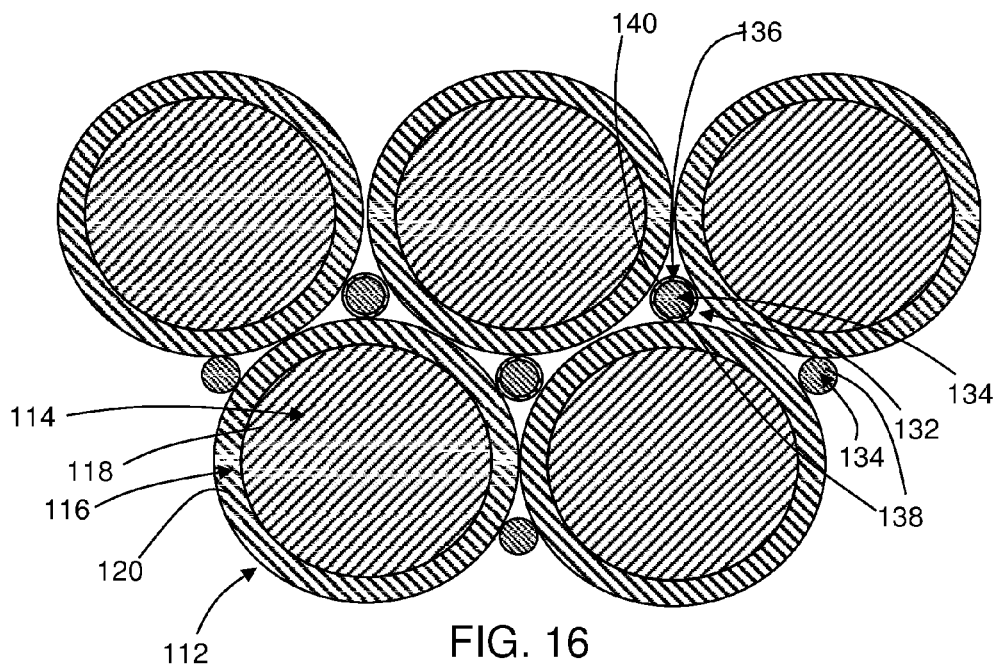
FIG. 16 is a cross-sectional view of a coated metallic powder used to make a nanomatrix composite powder compact as disclosed herein.

The corrodible core member 30 comprises a selectively corrodible first material 32. The first material 32 may include a metallic material that may be selectively and rapidly corroded by the predetermined wellbore fluid. More particularly, the selectively corrodible metallic material may include various metallic nanomatrix composite materials as described in commonly owned, co-pending U.S. patent application Ser. No. 12/633,682 filed on Dec. 8, 2009 and Ser. No. 12/913,310 filed on Oct. 27, 2010, which are incorporated herein by reference in their entirety. Referring to FIG. 16, the nanomatrix composites are compacts may be formed from a metallic powder 110 that includes a plurality of metallic, coated powder particles 112. Powder particles 112 may be formed to provide a powder 110, including free-flowing powder, that may be poured or otherwise disposed in all manner of forms or molds (not shown) having all manner of shapes and sizes and that may be used to fashion precursor powder compacts 100 (FIG. 19) and powder compacts 200 (FIG. 18), as described herein, that may be used as, or for use in manufacturing, various articles of manufacture, including various wellbore tools and components.

Each of the metallic, coated powder particles 112 of powder 10 includes a particle core 114 and a metallic coating layer 116 disposed on the particle core 114. The particle core 114 includes a core material 118. The core material 118 may include any suitable material for forming the particle core 114 that provides powder particle 112 that can be sintered to form a lightweight, high-strength powder compact 200 having selectable and controllable dissolution characteristics. In one embodiment, suitable core materials include electrochemically active metals having a standard oxidation potential greater than or equal to that of Zn, and in another embodiment include Mg, Al, Mn, Fe or Zn or a combination thereof. Core material 118 may also include other metals that are less electrochemically active than Zn or non-metallic materials, or a combination thereof. Suitable non-metallic materials include ceramics, composites, glasses or carbon, or a combination thereof. Core material 118 may be selected to provide a high dissolution rate in a predetermined wellbore fluid, but may also be selected to provide a relatively low dissolution rate, including zero dissolution, where dissolution of the nanomatrix material causes the particle core 114 to be rapidly undermined and liberated from the particle compact at the interface with the wellbore fluid, such that the effective rate of dissolution of particle compacts made using particle cores 114 of these core materials 118 is high, even though core material 118 itself may have a low dissolution rate, including core materials 120 that may be substantially insoluble in the wellbore fluid.

Each of the metallic, coated powder particles 112 of powder 110 also includes a metallic coating layer 116 that is disposed on particle core 114. Metallic coating layer 116 includes a metallic coating material 120. Metallic coating material 120 gives the powder particles 112 and powder 110 its metallic nature. Metallic coating layer 116 is a nanoscale coating layer. In an exemplary embodiment, metallic coating layer 116 may have a thickness of about 25 nm to about 2500 nm. The thickness of metallic coating layer 116 may vary over the surface of particle core 114, but will preferably have a substantially uniform thickness over the surface of particle core 114. Metallic coating layer 116 may include a single layer or a plurality of layers as a multilayer coating structure. Metallic coating material 120 may include any suitable metallic coating material 120 that provides a sinterable outer surface 121 that is configured to be sintered to an adjacent powder particle 112 that also has a metallic coating layer 116 and sinterable outer surface 121. In an exemplary embodiment of a powder 110, particle core 114 includes Mg, Al, Mn, Fe or Zn, or a combination thereof, as core material 118, and more particularly may include pure Mg and Mg alloys, and metallic coating layer 116 includes Al, Zn, Mn, Mg, Mo, W, Cu, Fe, Si, Ca, Co, Ta, Re, or Ni, or an oxide, nitride or a carbide thereof, or a combination of any of the aforementioned materials as coating material 120. Powder 110 may also include an additional or second powder 30 interspersed in the plurality of powder particles 112, as illustrated in FIG. 16. In an exemplary embodiment, the second powder 130 includes a plurality of second powder particles 132. These second powder particles 132 may be selected to change a physical, chemical, mechanical or other property of a powder particle compact 200 formed from powder 110 and second powder 130, or a combination of such properties. In an exemplary embodiment, the property change may include a gradient in composition or density, or a combination thereof, in gradient portion 70. Second powder particles 132 may be uncoated or coated with a metallic coating layer 136. When coated, including single layer or multilayer coatings, the coating layer 136 of second powder particles 132 may comprise the same coating material 140 as coating material 120 of powder particles 112, or the coating material 140 may be different. The second powder particles 132 (uncoated) or particle cores 134 may include any suitable material to provide the desired benefit, including many metals. In an exemplary embodiment, when coated powder particles 112 comprising Mg, Al, Mn, Fe or Zn, or a combination thereof are employed, suitable second powder particles 32 may include Ni, W, Cu, Co or Fe, or a combination thereof, for example.

As used herein, the use of the term substantially-continuous cellular nanomatrix 216 does not connote the major constituent of the powder compact, but rather refers to the minority constituent or constituents, whether by weight or by volume. This is distinguished from most matrix composite materials where the matrix comprises the majority constituent by weight or volume. The use of the term substantially-continuous, cellular nanomatrix is intended to describe the extensive, regular, continuous and interconnected nature of the distribution of nanomatrix material 220 within powder compact 200. As used herein, "substantially-continuous" describes the extension of the nanomatrix material throughout powder compact 200 such that it extends between and envelopes substantially all of the dispersed particles 214. Substantially-continuous is used to indicate that complete continuity and regular order of the nanomatrix around each dispersed particle 214 is not required. For example, defects in the coating layer 116 over particle core 114 on some powder particles 112 may cause bridging of the particle cores 114 during sintering of the powder compact 200, thereby causing localized discontinuities to result within the cellular nanomatrix 216, even though in the other portions of the powder compact the nanomatrix is substantially continuous and exhibits the structure described herein. As used herein, "cellular" is used to indicate that the nanomatrix defines a network of generally repeating, interconnected, compartments or cells of nanomatrix material 220 that encompass and also interconnect the dispersed particles 214. As used herein, "nanomatrix" is used to describe the size or scale of the matrix, particularly the thickness of the matrix between adjacent dispersed particles 214. The metallic coating layers that are sintered together to form the nanomatrix are themselves nanoscale thickness coating layers. Since the nanomatrix at most locations, other than the intersection of more than two dispersed particles 214, generally comprises the interdiffusion and bonding of two coating layers 116 from adjacent powder particles 112 having nanoscale thicknesses, the matrix formed also has a nanoscale thickness (e.g., approximately two times the coating layer thickness as described herein) and is thus described as a nanomatrix. Further, the use of the term dispersed particles 214 does not connote the minor constituent of powder compact 200, but rather refers to the majority constituent or constituents, whether by weight or by volume. The use of the term dispersed particle is intended to convey the discontinuous and discrete distribution of particle core material 218 within powder compact 200.

Figure 17:
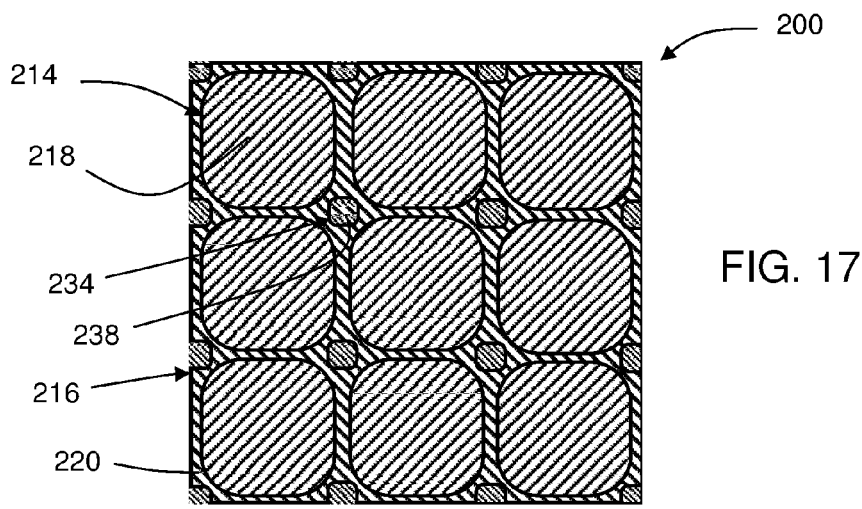
FIG. 17 is a cross-sectional view of a nanomatrix composite powder compact as disclosed herein.

The equiaxed morphology of the dispersed particles 214 and cellular network 216 of particle layers results from sintering and deformation of the powder particles 112 as they are compacted and interdiffuse and deform to fill the interparticle spaces 115. The sintering temperatures and pressures may be selected to ensure that the density of powder compact 200 achieves substantially full theoretical density. Referring to FIG. 17, sintered powder compact 200 may comprise a sintered precursor powder compact 100 that includes a plurality of deformed, mechanically bonded powder particles as described herein. Precursor powder compact 100 may be formed by compaction of powder 110 to the point that powder particles 112 are pressed into one another, thereby deforming them and forming interparticle mechanical or other bonds associated with this deformation sufficient to cause the deformed powder particles 112 to adhere to one another and form a green-state powder compact having a green density that may be varied and is less than the theoretical density of a fully-dense compact of powder 110, due in part to interparticle spaces 115. Compaction may be performed, for example, by isostatically pressing powder 110 at room temperature to provide the deformation and interparticle bonding of powder particles 112 necessary to form precursor powder compact 100.

Sintered and dynamically forged powder compacts 200 that include dispersed particles 214 comprising Mg and nanomatrix 216 comprising various nanomatrix materials as described herein have demonstrated an excellent mechanical strength and low density. Dynamic forging as used herein means dynamic application of a load at temperature and for a time sufficient to promote sintering of the metallic coating layers 16 of adjacent powder particles 12, and may preferably include application of a dynamic forging load at a predetermined loading rate for a time and at a temperature sufficient to form a sintered and fully-dense powder compact 200. In an exemplary embodiment where particle cores 14 included Mg and metallic coating layer 16 included various single and multilayer coating layers as described herein, such as various single and multilayer coatings comprising Al, the dynamic forging was performed by sintering at a temperature, $T_S$, of about 450° C. to about 470° C. for up to about 1 hour without the application of a forging pressure, followed by dynamic forging by application of isostatic pressures at ramp rates between about 0.5 to about 2 ksi/second to a maximum pressure, $P_S$, of about 30 ksi to about 60 ksi, which resulted in forging cycles of 15 seconds to about 120 seconds.

Powder compacts 200 that include dispersed particles 214 comprising Mg and nanomatrix 216 comprising various nanomatrix materials 220 described herein have demonstrated room temperature compressive strengths of at least about 37 ksi, and have further demonstrated room temperature compressive strengths in excess of about 50 ksi. Powder compacts 200 of the types disclosed herein are able to achieve an actual density that is substantially equal to the predetermined theoretical density of a compact material based on the composition of powder 110, including relative amounts of constituents of particle cores 114 and metallic coating layer 116, and are also described herein as being fully-dense powder compacts. Powder compacts 200 comprising dispersed particles that include Mg and nanomatrix 216 that includes various nanomatrix materials as described herein have demonstrated actual densities of about 1.738 $g/cm^3$ to about 2.50 $g/cm^3$, which are substantially equal to the predetermined theoretical densities, differing by at most 4% from the predetermined theoretical densities. Powder compacts 200 comprising dispersed particles 214 that include Mg and cellular nanomatrix 216 that includes various nanomatrix materials as described herein demonstrate corrosion rates in 15% HCl that range from about 4750 mg/cm$^2$/hr to about 7432 mg/cm$^2$/hr. This range of response provides, for example the ability to remove a 3 inch diameter ball formed from this material from a wellbore by altering the wellbore fluid in less than one hour.

The outer member 40 is disposed on the core member 30 and includes a second material 42 that is corrodible in the predetermined wellbore fluid 24 at a second corrosion rate. The first corrosion rate of the first material 32 is substantially greater than the second corrosion rate of the second material 42 as described herein. The second material 42 of the outer member 40 may be any suitable material, including various metals, polymers or ceramics, or composites thereof, or other combinations thereof. Suitable metals include alloys typically employed in tubular products used in a wellbore environment, including various grades of steel, particularly various grades of stainless steel. Other suitable alloys include Fe-base, Ni-base and Co-base alloys and superalloys. Suitable polymers may include any polymer that provides low permeability to the predetermined wellbore fluid 24 for a time sufficient to function as second material 42 as described herein. Suitable polymers include various fluoropolymers and polyurethanes. Suitable ceramics may include metal carbides, oxides or nitrides, or combinations thereof, including tungsten carbide, silicon carbide, boron carbide, alumina, zirconia, chromium oxide, silicon nitride or titanium nitride.

In one embodiment, the difference in the corrosion rates of the first material 32 and the second material 42 allows the selectively corrodible downhole article 10 to be utilized for its intended purpose, such as a specific wellbore operation, in the presence of the predetermined wellbore fluid 24 and provides an operating lifetime or critical service time in the predetermined wellbore fluid 24 that is sufficient to perform the wellbore operation. In another exemplary embodiment, the difference in corrosion rates allows the downhole article 10 to be utilized for its intended purpose, such as a specific wellbore operation, without being exposed to the predetermined wellbore fluid 24, and once the wellbore operation is completed the predetermined wellbore fluid may be introduced to selectively corrode the article 10. Examples of the rapid corrosion rates of the first material 32 are provided above. The second corrosion rate of the second material 42 in the wellbore fluid may be any suitable rate that is lower than the first corrosion rate, more particularly it may be lower by about one to about ten orders of magnitude, and more particularly by about one to about three orders of magnitude. This may include corrosion rates of about 0.001 mg/cm$^2$/hr to about 1.0 mg/cm$^2$/hr.

Figure 2:
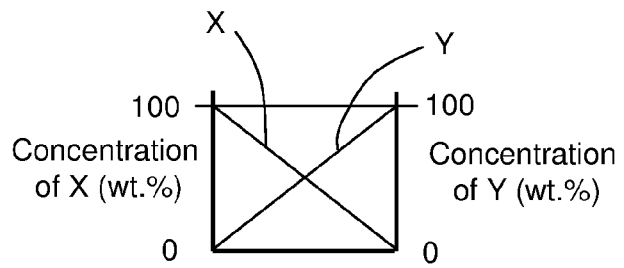
FIG. 2 is a cross-sectional view of section 2 of FIG. 1 illustrating an embodiment of a gradient portion as disclosed herein.
Figure 2:
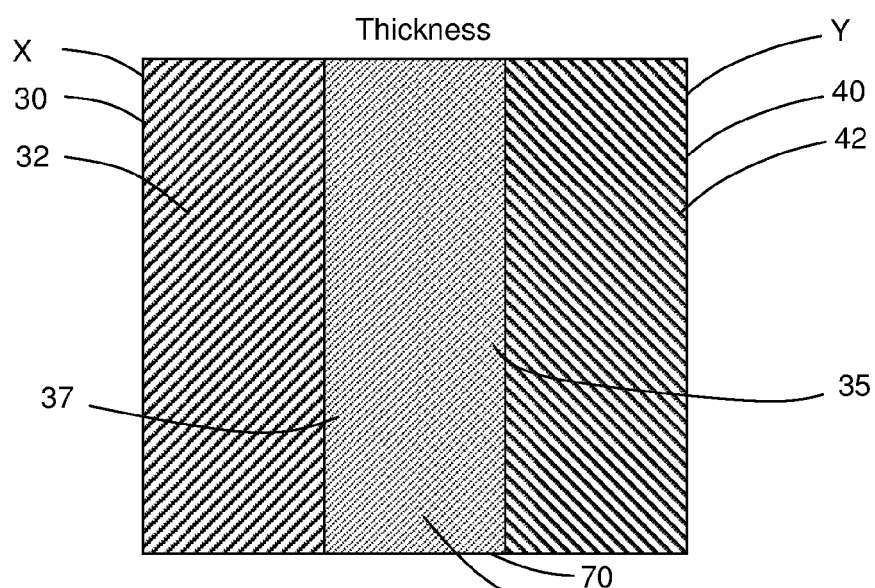
Figure 3:
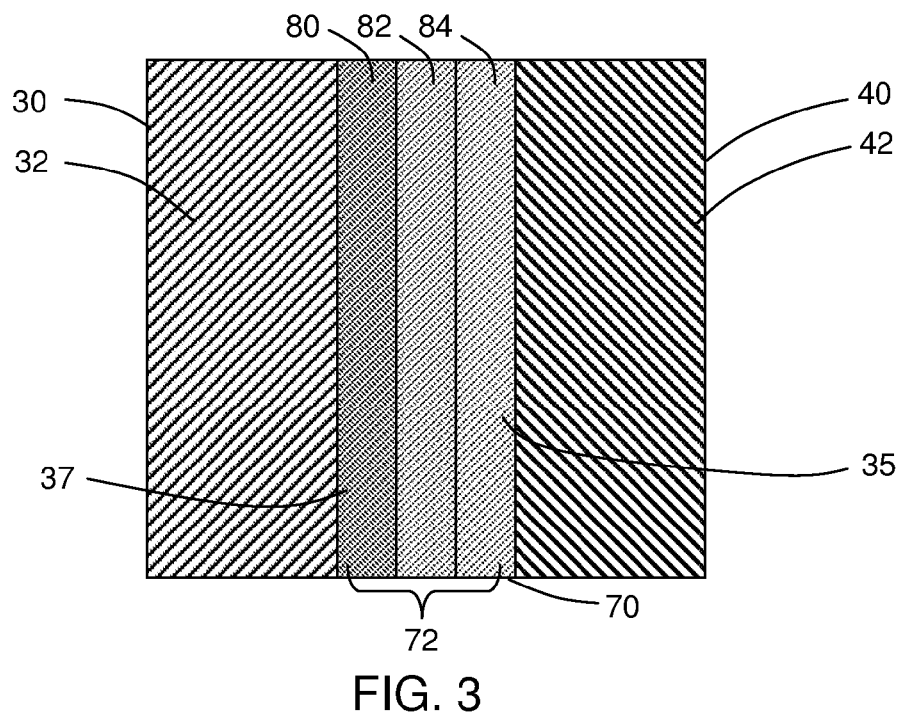
FIG. 3 is a cross-sectional view of another embodiment of a gradient portion as disclosed herein.

As illustrated in the Figures, and more particularly in FIGS. 2 and 3, the corrodible core member 32 has a gradient portion 70 that has a composition gradient or a density gradient, or a combination thereof. In one embodiment, the gradient portion 70 includes a composition gradient or density gradient, or combination thereof, that includes one or more transition layers disposed between the corrodible core member and the outer member. This layer or layers may be used for any suitable purpose, including, for example, to provide a transition between the first material and second material where these materials have different material properties, such as different crystal structures, coefficients of thermal expansion and the like, in order to reduce the stresses at the interface between them and promote the adherence of the outer member 40 to the core member 30. This layer or layers may also be used to control the density of the article 10 by providing a region in which the first material 32 of the core member may be adjusted by the addition of a controlled amount of another material, such as an amount of the second material 42, in order to provide the article 10 with a predetermined density. This layer or layers may also be used to control the corrosion rate of the article 10 by providing a layer or layers that have a different corrosion rate than that of the first material 32 of the core member 30 or the second material 42 of the outer member 40, such as a corrosion rate that lies between the corrosion rates of the first material 32 and the second material 42. While this gradient portion 70 is described above as a composition gradient or density gradient, or combination thereof, of the core member 30 it will be understood that the gradient portion 70 may also be associated with the outer member 40, and further, may be considered to be a separate gradient member 72 disposed between the outer member 40 and the core member 30. While the composition gradient or density gradient, or combination thereof, may comprise a layer or plurality of layers disposed uniformly about the core member 30, it may also be disposed non-uniformly as a portion 70 or region between the core member 30 and the outer member 40, and may be used, for example, to provide a varying weight distribution within the article 10, including various non-axisymmetric weight distributions. As such, the composition gradient or density gradient, or combination thereof, may be used, for example, to orient or preposition the article as it descends in the wellbore through a wellbore fluid by non-uniformly weighting a specific portion of the article 10.

Gradient portion 70 and the associated composition gradient or density gradient, or a combination thereof, may be established in any suitable manner. In an exemplary embodiment a composition gradient may be established by disposing a layer that includes a powder compact of a powder mixture of the first material 32 and another material, such as the second material 42, between the core member and the outer member. Even where the core member 30 and the gradient portion 70 or layer that includes the composition gradient are compacted to full theoretical density, such an arrangement provides a composition gradient and a density gradient so long as the first material and the other material are different materials having different densities. For example, if the core member 30 is formed by compacting a powder comprising magnesium alloy particle cores having aluminum or aluminum alloy nano layers to form a nanomatrix composite comprising dispersed magnesium particles in an aluminum or aluminum alloy nanomatrix as described herein, a composition gradient may be formed in gradient portion 70 by compacting a mixture of the same aluminum coated magnesium powder particles used to form the core member 30 with nanoparticles or microparticles of another metal or metal alloy, such as particles of the second material 42. While a composition gradient may be formed by using the second material 42 of the outer member 40, a density gradient may also be formed using any other material, including second material 42 that has a density different from the first material 32. The other material used to form the composition gradient may be any suitable material, including various metals and metal alloys, ceramics, glasses and the like. Where the composition gradient is also being used to provide a density gradient, the use of various high atomic weight metals may be useful, including those in Groups IVB-VIIB of the periodic table.

A density gradient may be established in any suitable manner, including that described above where a powder of the first material 32 is mixed with a powder of another material, such as second material 42, and then compacted to a predetermined density, such as the full theoretical density of the mixture of these materials, to form a powder compact. A density gradient may also be established in the gradient portion 70 by compacting a powder of the first material 32 to a density different than that of the first material 32 of the core member 30, including a density that is greater than or less than the density of the core member 30. In one embodiment, the core member 30 may comprise a powder compact of a powder of the first material 32 that is compacted to full theoretical density, and a gradient portion 70 layer may comprise a powder compact of the powder of the first material 32 that is compacted to less than full theoretical density. In another embodiment, the core member 30 may comprise a powder compact of a powder of the first material 32 that is compacted to less than full theoretical density, and gradient portion 70 or layer may comprise a powder compact of a powder of the first material 32 that is compacted to a higher density, including full theoretical density.

The gradient portion 70 having the composition gradient or the density gradient, or a combination thereof, of the first material 32 may extend from an outer portion 35 proximate the outer member 40 toward an inner portion 37 away from the outer member 40 either as a single layer or region as shown in FIG. 2, or a plurality of discrete layers or compositional steps, as illustrated in FIG. 3. In one embodiment, the gradient portion 70 may include a decreasing amount or a decreasing density, or a combination thereof, of the first material 32 from the inner portion 37 to the outer portion 35. For example, in FIG. 2, the core member 30 comprises 100 weight percent of the first material 32, such as a nanomatrix of aluminum having magnesium or magnesium alloy particles dispersed therein. Gradient portion 70 includes three discrete layers having different compositions. The first layer 80 may comprise, for example, a substantially spherical powder compact of a homogeneous powder mixture that comprises 75% by weight of the first material 32 and 25% by weight of the second material 42. The second layer 82 may comprise, for example, 50% by weight of the first material 32 and 50% by weight of the second material 42. The third layer 84 may comprise, for example, 25% by weight of the first material 32 and 75% by weight of the second material 42. The outer member 40 comprises 100% by weight of the second material. In this embodiment, the composition gradient or the density gradient, or a combination thereof, varies in discrete steps from the inner portion 37 to the outer portion 35 corresponding to layers that provide a plurality of discrete compositional and density steps, each having a different composition and density as described above.

In another example, the composition gradient or the density gradient, or a combination thereof, of the first material in the core member varies continuously from the inner portion to the outer portion as illustrated in FIG. 2. The amount of the first member may vary, for example, from 100% by weight of the first material in the inner portion 37 of core member 30 to 0% by weight in the outer portion 35. Correspondingly, the amount of the other material, such as second material 42, may vary, for example, from 100% by weight of the second material in the outer portion 35 to 0% by weight in the inner portion 37. In this example, the corrodible core member 30 also comprises a gradient portion 70 having a composition gradient or a density gradient, or a combination thereof, of the second material 42 in the corrodible core member 30 from the outer portion 35 proximate the outer member 40 toward the inner portion 37.

The outer member 40 may be configured to have a thickness, either uniform or a variable, sufficient to provide a predetermined working time of the downhole article 10, including a predetermined working time in the predetermined wellbore fluid 24, whereupon the corrosion rate of the second material 42 in the predetermined wellbore fluid thins the outer member sufficiently that the predetermined wellbore fluid contacts the first material 32 and begins to rapidly corrode the core member 30, including the gradient portion 70 therebetween. For example, the corrosion of the outer member 40 may proceed substantially uniformly at the second corrosion rate over all or a portion of the surface 44 of the outer member 40 until the predetermined wellbore fluid 24 breaches the outer member 40 and contacts the first material 32 of core member 30, including the gradient portion 70 disposed therebetween. In another example, the outer member 40 may include an access point 90, or a plurality of access points 90, that is configured to provide access of the predetermined wellbore fluid 24 through the outer member 40 to the core member 30 in order to corrode the first material 32 of the corrodible core member 30 in response to a predetermined wellbore condition as illustrated in FIGS. 4-12. The wellbore condition may include any suitable condition that may be used to provide access of the predetermined wellbore fluid 24 to the corrodible core member 30. In one embodiment, the access point 90 may include a localized thinning of the outer member 40 and second material 42, either by providing a recess in the surface 44 of the outer member or a protrusion of the corrodible core member 30 as shown in FIG. 4 and the wellbore condition may include placing the predetermined wellbore fluid in contact with the access point 90 for a time sufficient to enable the predetermined wellbore fluid 24 to corrode the thickness of the second material 42 at the access point 90. In another embodiment, the access point 90 may also comprise a different access point material 92 that may provide access through the outer member 40 in response to a wellbore condition, or a change in a wellbore condition, other than the predetermined wellbore fluid 24. For example, the wellbore condition may comprise heat or pressure, or a combination thereof, sufficient to alter a property of the access point 90, such as by a phase transformation, including melting, or a change in the mechanical properties, sufficient to enable the predetermined wellbore fluid 24 to access the core member 40. In another embodiment, the access point 90 may comprise a check valve 94 and enable access of the predetermined wellbore fluid 24 in response to a wellbore condition that includes a change in pressure. Any suitable wellbore conditions may also be used to provide access of the predetermined wellbore fluid 24 through the outer member 40 to the core member 30 through the access point 90. In an exemplary embodiment, the access point 90 may include at least one of the thickness difference, a compositional difference or a density difference of the second material 40 of the outer member 40 that is sufficient to provide access of the predetermined wellbore fluid 24 to the core member 30 in response to a wellbore condition, or a change in a wellbore condition.

In an exemplary embodiment, the at least one corrodible core member 30 and the at least one outer member 42 may comprise a plurality of core members having a corresponding plurality of outer members disposed thereon, wherein the respective core members 30 and associated outer members 40 are nested within one another to form an alternating arrangement of core members 30 and outer members 40 as illustrated in FIGS. 11 and 12. In the embodiment of FIG. 11, a plurality of hollow spherical core members 30 are nested within one another to form an alternating arrangement of diverter balls 12 comprising core members 30 with outer members 40. Each of the core members 30 and corresponding outer members 40 may be formed sequentially using methods described herein so that the innermost outer member 40/core member 30 may be encompassed by one or more successively larger outer members 40/core members 30. While the same shapes may be nested within one another, such as the plurality of diverter balls 12 illustrated in FIG. 11, as well as a plurality of cylindrical plugs (not shown) or a plurality of nested sleeves 22 or ball seats 14 (not shown), it is also possible to nest dissimilar shapes within one another. In the exemplary embodiment illustrated in FIG. 12, a cylindrical plug 16 may have an article 10 having another shape nested therein, such as a diverter ball 12. Likewise, a cylindrical plug 16 may have a diverter ball 12 or plurality of diverter balls 12 nested therein (not shown). These configurations provide an article 10 that may be selectively corroded to reconfigure the article into another article 10 that may be used for a subsequent wellbore operation without the necessity of running in the second or subsequent article 10. For example, a plurality of nested balls 12 may be used such that upon completion of a wellbore operation at a particularly level in the wellbore the outermost outer member 40/core member 30 may be removed and the diameters may be selected such that the remaining article 10 can pass through a ball seat to a lower level of the wellbore, for example. Of course, one of ordinary skill will understand that the opposite arrangement may also be affected, such that removal of the outermost outer member 40/core member 30 will enable the ball to be moved upwardly through a ball seat to a portion of the wellbore closer to the earth's surface.

Figure 10:
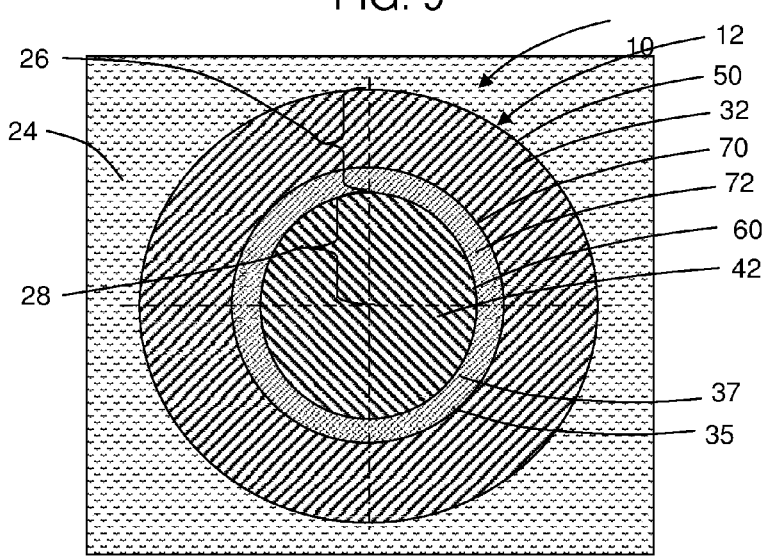
FIG. 10 is a cross-sectional view of an eighth exemplary embodiment of a downhole article as disclosed herein.

While the arrangement described above is useful in many applications, including those described, a reverse arrangement of the first material 32 and second material 42 is also possible as illustrated in FIG. 10, where the first material comprises the outer member 50 and the second material 42 comprises the core member 60 such that the outer member 50 may be rapidly corroded in a predetermined wellbore fluid 24 to expose the core member 60 that has a much lower corrosion rate. As such, the composite downhole article 10 may include at least one corrodible outer member 50 comprising a first material 32 as described herein that is corrodible in a wellbore fluid 24 at a first corrosion rate and at least one core member 60 disposed within the outer member 50 and comprising a second material 42 that is corrodible in the predetermined wellbore fluid 24 at a second corrosion rate, wherein the corrodible outer member 50 has a gradient portion 70 having a composition gradient or a density gradient, or combination thereof, and wherein the first corrosion rate is substantially greater than the second corrosion rate as described herein. Such a configuration may be desirable, for example, to position an article 10 in the wellbore in a certain location by using the outer member to orient the article 10 within the wellbore, followed by exposure to the predetermined wellbore fluid 24 to remove the outer member 50 and leave the core member in a specific location or orientation.

Figure 13:
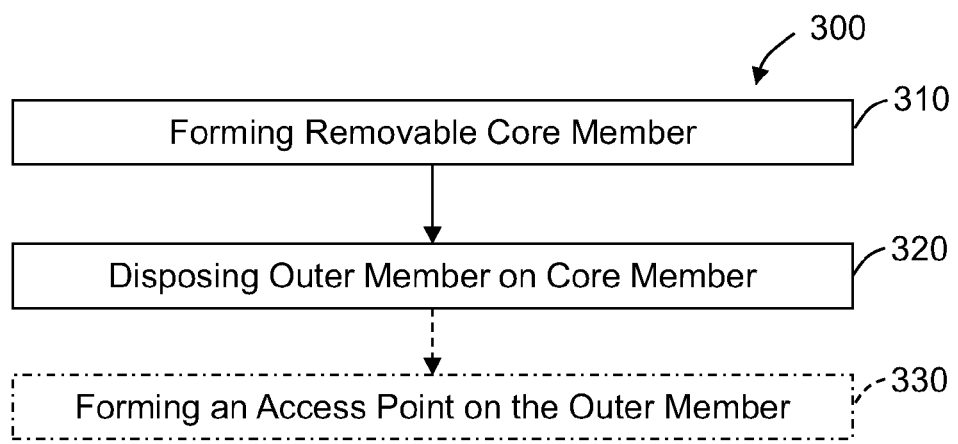
FIG. 13 is a flow diagram of a method of making a downhole article as disclosed herein.

Referring to FIG. 13, a method 300 of making composite downhole articles 10 as described herein is disclosed. The method 300 generally includes forming 310 at least one corrodible core member 30 comprising a first material 32 that is corrodible in a wellbore fluid 24 at a first corrosion rate and disposing 220 at least one outer member 40 on the core member 30, the outer member 40 comprising a second material 42 that is corrodible in the wellbore fluid at a second corrosion rate, wherein the corrodible core member 30 has a composition gradient or a density gradient, or a combination thereof, and wherein the first corrosion rate is substantially greater than the second corrosion rate.

The corrodible core member 30 may have any suitable configuration, including size and shape, as described herein. Forming 310 of the corrodible core member 30 may be performed using any suitable forming method, including pressing and dynamic forging of various powder compacts, particularly powder compacts of various coated metallic powders as described herein.

Figure 18:
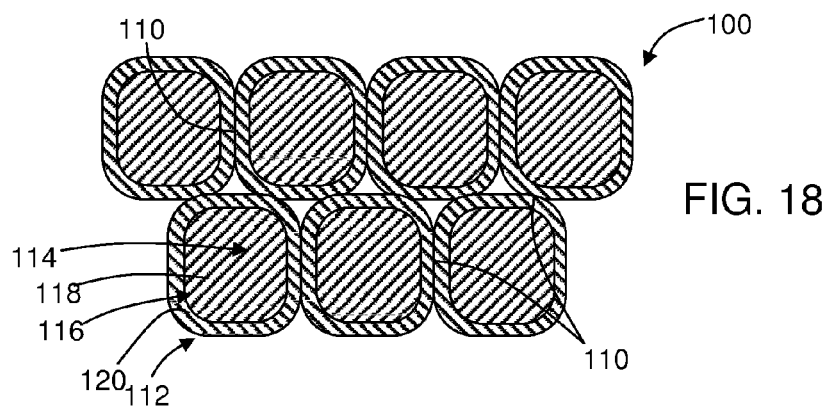
FIG. 18 is a cross-sectional view of a precursor nanomatrix composite powder compact as disclosed herein.

Forming 310 may include forming an unsintered or precursor powder compact 100 as the corrodible core member 30. An unsintered powder compact 100 (FIG. 18) may be formed, for example, by employing various powder compaction methods such as pressing, forging, extrusion, isostatic pressing and the like. Generally, the powder compaction to form an unsintered or precursor powder compact 100 will be performed without providing an external source of heat for heating the powder particles during compaction, or alternately, by heating the powder during compaction to a temperature that is substantially lower than a melting temperature of the material selected for the metallic coating layer, so that there is substantially no solid-state interdiffusion between adjacent powder particles. Unsintered powder compacts 100 may form mechanical bonds, for example, between the metallic coating layers of adjacent powder particles sufficient to retain a compacted shape of the corrodible core member 30. Unsintered powder compacts 100 will generally have a predetermined porosity or density, with the amount of porosity or density determined by factors associated with the compaction, such as the compaction pressure and time and the nature of the metallic powder used to form the compact. In one embodiment, the unsintered powder compact 100 may be formed by compacting a powder comprising a plurality of metallic powder particles, each powder particle comprising a particle core, the particle core comprises a core material comprising Mg, Al, Zn, Fe or Mn, or a combination thereof, and a metallic coating layer disposed on the particle core, wherein compacting causes the metallic coating layers of adjacent particles to form mechanical bonds to one another sufficient to form and retain the shape of the powder compact as illustrated in FIG. 18.

Forming 310 may also include forming a sintered powder compact 200 as the corrodible core member 30. A sintered powder compact 200 may include sintering to achieve substantially full theoretical density of the powder compact, as well as partial sintering to achieve less than full theoretical density of the powder compact, including partial sintering to achieve a predetermined porosity or density. Sintered powder compacts will generally be characterized by interdiffusion, such as solid-state interdiffusion, between the metallic coating layers of adjacent powder particles such that chemical or metallic bonds are formed between them. A sintered powder compact may be formed, for example, by employing various powder compaction methods such as pressing, rolling, forging including dynamic forging, extrusion or isostatic pressing including hot isostatic pressing, or a combination thereof, and the like. Generally, powder compaction to form a sintered powder compact will be performed in conjunction with providing an external source of heat for heating the powder particles during compaction, and may including heating the powder during compaction to a temperature near the melting temperature of the material selected for the metallic coating layer. In some embodiments, this may include heating the powder to a temperature just below a melting temperature of the metallic coating layer material, and in other embodiments may even include heating the powder to temperature that is slightly above a melting temperature of the metallic coating layer material. In an exemplary embodiment, forming 310 the sintered powder compact and corrodible core member 30 comprises forming a substantially-continuous, cellular nanomatrix comprising a nanomatrix material that includes a plurality of dispersed particles comprising a particle core material that comprises Mg, Al, Zn, Fe, or Mn, or an alloy thereof, or a combination thereof, dispersed in the cellular nanomatrix, and a bond layer extending throughout the cellular nanomatrix between the dispersed particles as illustrated in FIG. 17.

The gradient portion 70 and the associated composition or density gradient, or combination thereof, may be disposed between the corrodible core member 30 and the outer member 40 by any suitable method. It may be formed integrally with the corrodible core member 30, or as a separate gradient portion 70 or member that is disposed between the corrodible core member 30 and the outer member 40 prior to the outer member 40 being disposed on the corrodible core member 30, or by depositing a layer having the composition or density gradient, or combination thereof on the corrodible core member 30 prior to disposition of the outer member 40 thereon, for example. Forming 310 the corrodible core member 30 may include establishing the composition gradient or the density gradient, or a combination thereof, of the first material 32 from an outer portion 35 of the core member 30 proximate the outer member 40 toward an inner portion 37 of the core member 30 away from the outer member 40 as illustrated in FIGS. 2 and 3, for example.

In one embodiment, forming 310 includes establishing the composition gradient or the density gradient, or a combination thereof, of the first material 32 from an outer portion 37 proximate the outer member 40 toward an inner portion 35 away from the outer member 40 by varying the composition gradient or the density gradient, or a combination thereof, continuously from the inner portion 37 to the outer portion 35 as shown in FIG. 2. This may be accomplished, for example, by varying the density of the first material 32 continuously in the gradient portion 70. Various forms of spray forming and fusion of a powder of the first material 32 may be employed to vary the density continuously, such as laser sintering of a precursor compact 100, laser direct deposition or cladding, stereolithography and fused deposition modeling deposition methods. This may include, for example, progressive laser fusion of a powder of the first material 32 having a single powder size with continuously varying energy or power to provide greater and lesser degrees of fusion and bonding of the powder particles and a continuously varying density. In another exemplary embodiment, the composition or density, or a combination thereof, of the first material 32 may be varied continuously from the inner portion 37 to the outer portion 35. Various forms of spray forming and fusion of at least two powders sizes of the first material 32 may be employed to vary the density or composition, or a combination thereof, by continuously varying the amount of the two powder sizes provided using a fixed or a variable energy or power density. In yet another exemplary embodiment, this may be performed by varying the composition of the first material 32 in the gradient portion 70 by incorporation of a continuously varying amount of another material, such as the second material 42 in the first material 32 in the gradient portion 70. For example, a continuously varying amount by weight from 100% second material 42/0% first material 32 in the outer portion 35 proximate the outer member 40 to 0% second material 42/100% first material 32 in the inner portion 37. Various forms of spray forming and fusion of powders of the first material and the other material, such as second material, may be employed to vary the composition continuously, such as laser fusion of the powders as they are simultaneously applied in continuously varying proportions using a fixed or a variable energy or power density. Various known methods of ensuring uniform coverage of the material or materials being deposited may be employed, including rotating or rastering of the substrate during deposition and laser fusion of a sprayed powder, or alternately, rastering of a spayed powder and laser over the surface of the substrate during deposition.

In another embodiment, forming 310 includes establishing the composition gradient or the density gradient, or a combination thereof, of the first material 32 from an outer portion 35 proximate the outer member 40 toward an inner portion 37 away from the outer member 40 by varying the composition gradient or the density gradient, or a combination thereof, in discrete steps or layers from the inner portion 37 to the outer portion 35 as shown in FIG. 3. The density or composition, or a combination thereof, in each of the steps may be varied using the first material 32, or a combination of the first material 32 and another material, such as the second material 42, by any suitable method, such as the methods using laser fusion of powders described above. In each step or layer, the density or composition, or combination thereof, may be constant or may vary continuously.

Disposing 320 at least one outer member 40 on the core member 30 may be performed by any suitable method. In one embodiment, disposing 320 the outer member 40 on the core member 30 may include disposing a powder compact of the second material 42 on the core member 30. This may be performed, for example, by compacting a form or plurality of forms of the second material 42 that may be used to encompass the corrodible core member 30. For example, if the corrodible core member 30 is substantially spherical, the outer member 40 may comprise two hollow hemispherical powder compact members 40 that are sized to dispose their inner surfaces against an outer surface of the corrodible core member and be joined along their adjoining peripheral edges by a joint as shown in FIG. 1. In another embodiment, disposing 320 the outer member 40 on the core member 30 may include depositing a layer of the second material 42 on the core member 30. A layer of the second material 42 may be deposited by any suitable deposition method, including dipping in a molten metal bath, plating including electroplating and electroless plating, sputtering and other thin film deposition techniques, cladding, compacting a powder, thermal spraying, or laser fusion of a powder of the second material 42 on the outer surface or portion of the corrodible core member, or a combination thereof.

Referring to FIG. 13, method 300 may also optionally include forming 330 an access point 90 on the outer member, the access point 90 configured to provide access of a wellbore fluid to the core member in response to a change in a wellbore condition as described herein. Forming 330 of the access point 90 on the outer member 40 may be performed by any suitable forming method. Forming 330 may be performed integrally in conjunction with disposing 320 the outer member 40 on the core member 30, or by an additional forming operation or operations. For example, where the access point 90 comprises a localized thinning of the second material 42, this may be accomplished by design of the core member 30 and/or outer member 40. Alternately, it may be performed by chemical, mechanical or other removal of second material 42 from the outer member 40. Chemical removal may be accomplished by chemical or electrochemical milling, etching or other chemical removal methods, and may include the use of photolithographic masking or patterning techniques to define the form or shape of the access point 90 followed by suitable material removal by etching or other material removal techniques to form the access point. Mechanical removal may be accomplished by machining, drilling, grinding or other material removal methods.

Figure 14:
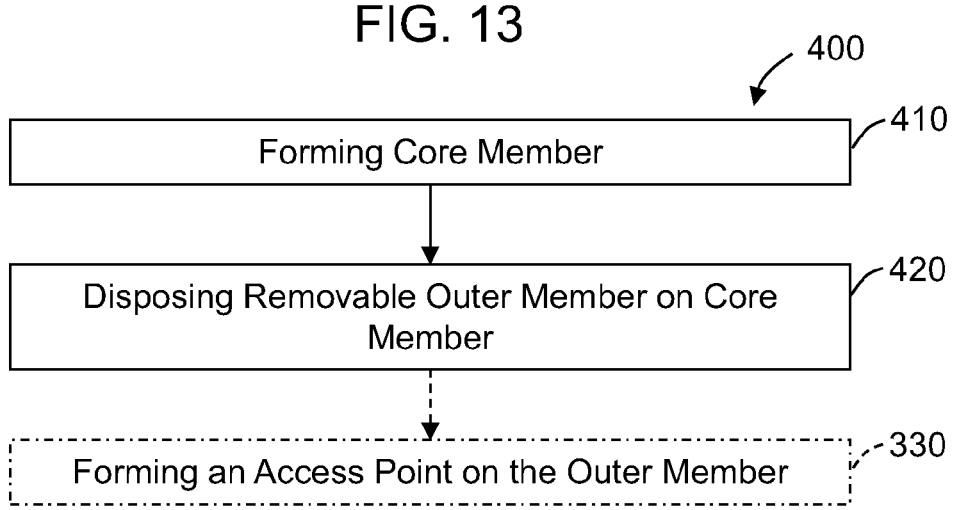
FIG. 14 is a flow diagram of a second method of making a downhole article as disclosed herein.

As described above, a reverse arrangement of the first material 32 and second material 42 is also possible as illustrated generally in FIGS. 10 and 14, and may be formed by a method 400 of making a composite downhole article 10 that includes forming 410 at least one core member 60 comprising a second material 42 that is corrodible in a wellbore fluid at a second corrosion rate and disposing 420 at least one corrodible outer member 50 on the core member 60 comprising a first material 32 that is corrodible in the predetermined wellbore fluid 24 at a first corrosion rate, wherein the corrodible outer member 50 has a composition gradient or a density gradient, or a combination thereof, and wherein the first corrosion rate is substantially greater than the second corrosion rate. In this configuration, the core member 60 of the second material 42 may be formed by any suitable fabrication method, including casting, forging, machining or various powder compaction methods, or a combination thereof.

Forming 410 the corrodible outer member 50 may include establishing the composition gradient or the density gradient, or a combination thereof, of the first material 32 from an inner portion 37 proximate the core member 60 toward an outer portion 35 away from the core member 60. Establishing the composition gradient or the density gradient, or a combination thereof, of the first material 32 from an inner portion 37 proximate the core member 60 toward an outer portion 35 away from the core member 60 may include varying the composition gradient or the density gradient, or a combination thereof, continuously as described herein from the inner portion 37 to the outer portion 35. Alternately, or in combination therewith, establishing the composition gradient or the density gradient, or a combination thereof, of the first material 32 from an inner portion 37 proximate the core member 60 toward an outer portion 35 away from the core member 30 may include varying the composition gradient or the density gradient, or a combination thereof, in discrete steps or layers from the inner portion 37 to the outer portion 35. Within each step, the composition gradient or the density gradient may be constant or vary continuously as described herein. As described herein the gradient portion 70, including the composition gradient or the density gradient, or a combination thereof, may be formed as a powder compact of the first material 32, or a combination of the first material and another material, including the second material 42, as described herein. In one embodiment, the method 400 and forming 410 may include establishing a composition gradient or a density gradient, or a combination thereof, of another material, including the second material 42 of the core member 60, in the corrodible outer member 50 from the inner portion 37 proximate the core member toward the outer portion 35, analogous to combinations of first material 32 and second material 42 described elsewhere herein.

In one embodiment, disposing 420 the corrodible outer member 50 on the core member 30 includes disposing a powder compact of the first material 32 on the core member 60. The powder compact of the first material 32 may be formed directly on the core member 60 using any of the powder application or compaction methods disclosed herein, or alternately, may be formed separately as a single piece or in multiple pieces, and disposed on the core member 60 by any suitable disposition method, including the methods disclosed herein, for attaching, joining or otherwise disposing the second material 42 on the first material 32.

Figure 15:
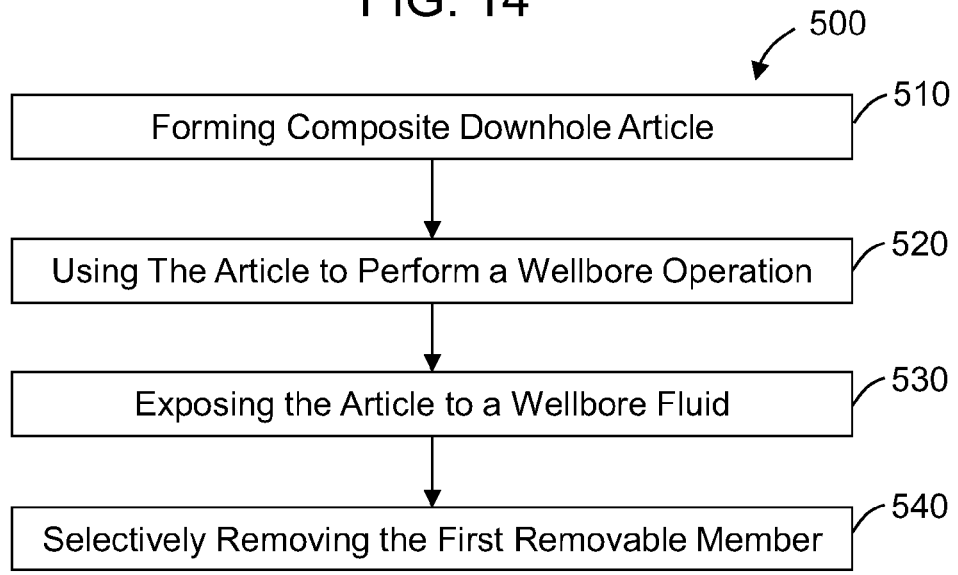
FIG. 15 is a flow diagram of a method of using a downhole article as disclosed herein.

In an exemplary embodiment, a method 500 of using a composite downhole article is disclosed as illustrated in FIG. 15. The method 500 includes forming 510 a composite downhole article that includes a first member 30, 50 comprising a first corrodible material 32 that is corrodible in a predetermined wellbore fluid 24 at a first corrosion rate and a second corrodible member 40,60 comprising a second material 42 that is corrodible in the wellbore fluid at a second corrosion rate, wherein the first corrodible member has a gradient portion 70 having composition gradient or a density gradient, or a combination thereof, and wherein the first corrosion rate is substantially greater than the second corrosion rate. Forming 510 may include or employ, for example, either of the method 300 or method 400 of making a composite downhole article 10. The method 500 also includes using 520 the article 10 to perform a first wellbore operation; exposing 530 the article to the predetermined wellbore fluid 24; and selectively corroding 540 the first corrodible member 30,50. The article used in method 500 may include any suitable downhole article 10, particularly various downhole tools and components.

In one embodiment, the downhole article 10 may include various configurations of diverter balls 12, plugs 16 or disks 20 as disclosed herein, wherein using 520 the article to perform a predetermined wellbore operation includes completely or partially closing an orifice in conjunction a fracturing, completion or production operation. The downhole article 10 has an outer member 40 that comprises a thin layer or coating of the second material 42 sufficient to close the desired orifice and resist the predetermined wellbore fluid 24 for a time sufficient to perform the predetermined wellbore operation, such as fracturing an earth formation. The outer member 40 and predetermined wellbore fluid 24 may be selected so that upon occurrence of a condition, such as, for example, passage of time sufficient for completion of the predetermined wellbore operation the predetermined wellbore fluid 24 has dissolved the outer member 40 sufficiently to gain access to the core member 30, whereupon the core member 30 is rapidly corroded by the predetermined wellbore fluid 24 causing any remaining portion of the outer member to collapse or disintegrate, thereby removing the diverter ball 12, plug 16 or disk 20 and opening the orifice. Other wellbore conditions may also be employed in any combination, including increasing a temperature and/or pressure of a wellbore fluid, insertion of another substance, such as another wellbore fluid to selectively increase the second corrosion rate of the second material 42 to facilitate its corrosion to provide access of the fluid to the first material 32.

In another embodiment, the downhole article 10 may include a tubular section 23 that may be used to form a portion of a casing of a wellbore having one or more portions of the tubular wall that include features 25 that includes a core member 30 and outer member 40 to define a feature, such as a through-hole 91 or opening, a blind hole 93 or blind opening, conduit, passage, groove 95, protruding rib 97, shoulder 99 or other feature. Using 520 the article 10 to perform a predetermined wellbore operation may include any suitable wellbore operation, such as use of a tubular section 23 as a conduit for fluids, slicklines, wirelines, tools, components or other wellbore articles through the tubular section for various purposes associated with fracturing, completion or production operations. The outer member 40 and wellbore fluid 24 may be selected so that upon occurrence of a condition, such as, for example, passage of time sufficient for completion of the predetermined wellbore operation the wellbore fluid dissolves the outer member 40 sufficiently to access the core member 30, whereupon the core member 30 is rapidly corroded by the wellbore fluid 24 causing any remaining portion of the outer member to collapse or disintegrate, thereby exposing the feature defined in the tubular section. This may be used, for example, to create an opening or multiple openings through the tubular section 23 analogous to a perforating operation, or to open a conduit such as might be used for a number of completion or production operations, including a fracturing operation. Exposure of a shoulder 95 or protruding rib 97 on an internal surface may be used, for example to provide a seat for a sleeve, ball or plug.

In yet another embodiment, the downhole article 10 may include a hollow cylinder that may be inserted, for example, within a casing and used as a sleeve 22 or seat, including a ball seat 14 or plug seat 18, having one or more portions of the hollow cylinder comprising a core member 30 and outer member 40 as disclosed herein. Using 520 may include any suitable use of the hollow cylinder, including as various fixed or sliding sleeves that may be used within a casing, such as sleeves that are use to conceal or reveal an opening or conduit in a casing, or various cylindrical seats that may be used with a ball 12 or plug 16 to open or close the wellbore for various purposes associated with fracturing, completion or production operations. The outer member 40 and predetermined wellbore fluid 24 may be selected so that upon occurrence of a condition, such as, for example, passage of time sufficient for completion of a predetermined wellbore operation the predetermined wellbore fluid 24 has dissolved the outer member 40 sufficiently to access the core member 30, whereupon the core member 30 is rapidly corroded by the wellbore fluid 24 causing any remaining portion of the outer member 40 to collapse or disintegrate, thereby removing the hollow cylinder from the wellbore.

Exposing 530 the article to the predetermined wellbore fluid 24 may include exposing the article 10 to any predetermined wellbore fluid 24 that is suitable for corrosion of the corrodible first material 32 and second material 42 as described herein. In one embodiment, exposing 530 may include immersing an exposed surface of the second material 42 in the wellbore fluid for a time sufficient to corrode through the second material 42 to the gradient portion 70, wherein the first material 32 in the gradient portion 70 begins to rapidly corrode and the first member 30, including the gradient portion 70, may be rapidly removed. Suitable wellbore fluids 24 may include water, various aqueous solutions, brines or acids, including organic or inorganic acids, or a combination thereof. In another embodiment, exposing 530 the downhole article 10 to the wellbore fluid 24 comprises opening an access point 90 in the second member 40 in response to a wellbore condition to allow the wellbore fluid to access the first corrodible member as described herein.

Selectively corroding 540 may include completely corroding the first corrodible member 30 such that the downhole article 10 is completely removed from the wellbore by the predetermined wellbore fluid 24. Alternately, selectively corroding 540 may comprise removing a portion of the downhole article 10. This may include, for example, corroding the first corrodible member 30 as described herein to alter the shape or size of the article 10. In one embodiment, where the article 10 comprises a plurality of nested articles, such as a plurality of nested balls 12, as described herein, selectively corroding 540 may include removing an outermost layer, such as an outermost ball 12, so that the size (e.g., diameter) of the article 10 is reduced and the remaining portion may pass through a seat to another section of the wellbore, either closer to or farther from the earth surface to be seated in another seat. Selectively corroding 540 may be repeated to successively remove nested articles 10 and reduce the size, such as the diameter of a ball 12, allowing the remaining portion to be progressively moved through a ball seat to another section of the wellbore, either closer to or farther from the earth surface to be seated in another seat.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A method of making a composite downhole article, comprising:
    forming at least one removable core member comprising a first metallic material that is removable in a wellbore fluid at a first removal rate; and
    disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate, and wherein disposing the outer member on the core member further comprises forming an access point on the outer member, the access point configured to provide access of a wellbore fluid to the core member in response to a change in a wellbore condition, and wherein the access point comprises a localized thinning of the outer member.

2. The method of claim 1, wherein the composite downhole article comprises a downhole tool or component.

3. The method of claim 1, wherein the composite downhole article comprises a ball, ball seat, plug, plug seat, disk, dart, sleeve, or tubular section.

4. The method of claim 1, wherein the composite downhole article comprises a plurality of nested balls, ball seats, plugs, plug seats, disks, darts, sleeves, or tubular sections.

5. A method of making a composite downhole article, comprising:
    forming at least one removable core member comprising a first metallic material that is removable in a wellbore fluid at a first removal rate; and
    disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate, and wherein disposing the outer member on the core member further comprises forming an access point on the outer member, the access point configured to provide access of a wellbore fluid to the core member in response to a change in a wellbore condition, and wherein the access point comprises an access point material that is different than the second material.

6. A method of making a composite downhole article, comprising:
    forming at least one removable core member comprising a first metallic material that is removable in a wellbore fluid at a first removal rate; and
    disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate, and wherein disposing the outer member on the core member further comprises forming an access point on the outer member, the access point configured to provide access of a wellbore fluid to the core member in response to a change in a wellbore condition, and wherein the access point comprises a check valve.

7. A method of making a composite downhole article, comprising:
forming at least one removable core member comprising a first metallic material that is removable in a wellbore fluid at a first removal rate; and
disposing at least one outer member on the core member, the outer member comprising a second material that is removable in the wellbore fluid at a second removal rate, wherein the removable core member has a composition gradient or a density gradient, or a combination thereof, and wherein the first removal rate is substantially greater than the second removal rate, and wherein the composite downhole article comprises a portion of a tubular section and is selectively removable or reconfigurable to define a feature in the tubular section, and wherein the feature comprises a through-hole, opening, blind hole, blind opening, conduit, passage, groove, protruding rib, or shoulder.

8. The method of claim 7, wherein at least one of forming the removable core member and disposing the outer member comprises forming an unsintered powder compact.

9. The method of claim 8, wherein forming the unsintered powder compact comprises compacting a powder comprising a plurality of metallic powder particles, each powder particle comprising: a particle core, the particle core comprises a core material comprising Mg, Al, Zn, Fe, or Mn, or a combination thereof, and a metallic coating layer disposed on the particle core, wherein compacting causes the metallic coating layers of adjacent particles to form mechanical bonds to one another sufficient to form the powder compact.

10. The method of claim 7, wherein at least one of forming the removable core member and disposing the outer member comprises forming a sintered powder compact.

11. The method of claim 10, wherein forming the sintered powder compact comprises forming a substantially-continuous, cellular nanomatrix comprising a nanomatrix material, a plurality of dispersed particles comprising a particle core material that comprises Mg, Al, Zn, Fe, or Mn, or a combination thereof, dispersed in the cellular nanomatrix, and a bond layer extending throughout the cellular nanomatrix between the dispersed particles.

12. The method of claim 7, wherein forming the removable core member comprises establishing the composition gradient or the density gradient, or a combination thereof, of the first material from an outer portion proximate the outer member toward an inner portion away from the outer member.

13. The method of claim 12, wherein establishing the composition gradient or the density gradient, or a combination thereof, of the first material from an outer portion proximate the outer member toward an inner portion away from the outer member comprises varying the composition gradient or the density gradient, or a combination thereof, continuously from the inner portion to the outer portion.

14. The method of claim 12, wherein establishing the composition gradient or the density gradient, or a combination thereof, of the first material from an outer portion proximate the outer member toward an inner portion away from the outer member comprises varying the composition gradient or the density gradient, or a combination thereof, in discrete steps from the inner portion to the outer portion.

15. The method of claim 12, further comprising establishing a composition gradient or a density gradient, or a combination thereof, of the second material in the removable core member from the outer portion proximate the outer member toward the inner portion.

16. The method of claim 7, wherein disposing the outer member on the core member comprises disposing a powder compact of the second material on the core member.

17. The method of claim 7, wherein disposing the outer member on the core member comprising depositing a layer of the second material on the core member.

18. The method of claim 17, wherein depositing the layer of the second material comprises dipping, plating, sputtering, cladding, thermal spraying, or laser fusion, or a combination thereof.

19. The method of claim 7, wherein the composite downhole article comprises a sleeve, and wherein the sleeve is configured to close an orifice in a tubular section.

20. The method of claim 7, wherein the composite downhole article comprises a selectively removable downhole article that is selectively removable from a wellbore using the wellbore fluid.

21. The method of claim 7, wherein the composite downhole article comprises a selectively reconfigurable downhole article that is selectively reconfigurable within a wellbore using the wellbore fluid.

22. A method of making a composite downhole article, comprising:
forming at least one core member comprising a first material that is removable in a wellbore fluid at a first removal rate; and
disposing at least one removable outer member on the core member and comprising a second material that is removable in the wellbore fluid at a second removal rate, wherein the removable outer member has a composition gradient or a density gradient, or a combination thereof, and wherein at least one of the first material and the second material comprises a metallic material, and wherein the second removal rate is substantially greater than the first removal rate, and wherein the composite downhole article comprises a portion of a tubular section and is selectively removable or reconfigurable to define a feature in the tubular section and wherein the feature comprises a through-hole, opening, blind hole, blind opening, conduit, passage, groove, protruding rib, or shoulder.

23. The method of claim 22, wherein forming the removable core member comprises establishing the composition gradient or the density gradient, or a combination thereof, of the second material from an inner portion proximate the core member toward an outer portion away from the core member.

24. The method of claim 23, wherein establishing the composition gradient or the density gradient, or a combination thereof, of the second material from an inner portion proximate the core member toward an outer portion away from the core member comprises varying the composition gradient or the density gradient, or a combination thereof, continuously from the inner portion to the outer portion.

25. The method of claim 23, wherein establishing the composition gradient or the density gradient, or a combination thereof, of the second material from an inner portion proximate the core member toward an outer portion away from the core member comprises varying the composition gradient or the density gradient, or a combination thereof, in discrete steps from the inner portion to the outer portion.

26. The method of claim 23, further comprising establishing a composition gradient or a density gradient, or a combination thereof, of the first material in the removable outer member from the inner portion proximate the core member toward the outer portion.

27. The method of claim 22, wherein disposing the outer member on the core member comprises disposing a powder compact of the second material on the core member.

28. The method of claim 22, wherein the composite downhole article comprises a downhole tool or component.

29. The method of claim 22, wherein the composite downhole article comprises a ball, ball seat, plug, plug seat, disk, dart, sleeve, or tubular section.

30. The method of claim 22, wherein the composite downhole article comprises a plurality of nested balls, ball seats, plugs, plug seats, disks, darts, sleeves, or tubular sections.

31. The method of claim 22, wherein the composite downhole article comprises a sleeve, and wherein the sleeve is configured to close an orifice in a tubular section.

32. The method of claim 22, wherein the composite downhole article comprises a selectively removable downhole article that is selectively removable from a wellbore using the wellbore fluid.

33. The method of claim 22, wherein the composite downhole article comprises a selectively reconfigurable downhole article that is selectively reconfigurable within a wellbore using the wellbore fluid.

34. A method of making a composite downhole article, comprising:
    forming a first member comprising a first material that is removable in a wellbore fluid at a first removal rate; and
    disposing a second removable member on the first member, the second removable member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a ball, ball seat, plug, plug seat, disk, dart, sleeve, or tubular section.

35. The method of claim 34, wherein the second member comprises a composition gradient or a density gradient, or a combination thereof.

36. The method of claim 34, wherein the powder compact comprises an unsintered powder compact, a sintered powder compact, or a partially sintered powder compact.

37. The method of claim 34, wherein the plurality of metallic coated powder particles each comprise a particle core of a core material and a metallic coating layer comprising Al, Zn, Mn, Mg, Mo, W, Cu, Fe, Si, Ca, Co, Ta, Re, or Ni, or an oxide, nitride or a carbide thereof, or a combination of any of the aforementioned materials.

38. The method of claim 37, wherein the core material comprises Mg, Al, Mn, Fe or Zn, or a combination thereof.

39. A method of making a composite downhole article, comprising:
    forming a first member comprising a first material that is removable in a wellbore fluid at a first removal rate; and
    disposing a second removable member on the first member, the second removable member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a plurality of nested balls, ball seats, plugs, plug seats, disks, darts, sleeves, or tubular sections.

40. A method of making a composite downhole article, comprising:
    forming a first member comprising a first material that is removable in a wellbore fluid at a first removal rate; and
    disposing a second removable member on the first member, the second removable member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a portion of a tubular section and is selectively removable or reconfigurable to define a feature in the tubular section.

41. The method of claim 40, wherein the feature comprises a through-hole, opening, blind hole, blind opening, conduit, passage, groove, protruding rib, or shoulder.

42. A method of using a composite downhole article, comprising:
    forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the article comprises a diverter ball, plug or disk and a wellbore operation comprises closing an orifice during fracturing, completion or production;
    using the article to perform a first wellbore operation;
    exposing the article to the wellbore fluid; and
    selectively removing the second removable member.

43. The method of claim 42, wherein exposing the article to the wellbore fluid comprises exposing the article to water, brine, or an acid, or a combination thereof.

44. The method of claim 42, wherein selectively corroding comprises completely corroding the second removable member.

45. The method of claim 42, wherein selectively corroding comprises partially corroding the second removable member.

46. The method of claim 45, wherein partially corroding the second removable member comprises removing a layer of the second removable member.

47. The method of claim 45, wherein partially corroding the second removable member comprises removing a removable portion of the member to provide a remaining portion.

48. The method of claim 47, wherein the remaining portion has a shape that is different than a shape of the second removable member.

49. The method of claim 42, wherein exposing the article to the wellbore fluid comprises opening an access point in the first member to allow the wellbore fluid to access the second removable member.

50. The method of claim 42, wherein the second corrodible member has a composition gradient or a density gradient, or a combination thereof.

51. The method of claim 42, wherein the second member is a core member and the first member is an outer member disposed on the core member.

52. The method of claim 42, wherein the first member is a core member and the second member is an outer member disposed on the core member.

53. The method of claim 42, wherein the powder compact comprises an unsintered powder compact, a sintered powder compact, or a partially sintered powder compact.

54. The method of claim 42, wherein the plurality of metallic coated powder particles each comprise a particle core of a core material and a metallic coating layer comprising Al, Zn, Mn, Mg, Mo, W, Cu, Fe, Si, Ca, Co, Ta, Re, or Ni, or an oxide, nitride or a carbide thereof, or a combination of any of the aforementioned materials.

55. The method of claim 54, wherein the core material comprises Mg, Al, Mn, Fe or Zn, or a combination thereof.

56. A method of using a composite downhole article, comprising:
forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a ball, ball seat, plug, plug seat, disk, dart, sleeve, or tubular section;
using the article to perform a first wellbore operation;
exposing the article to the wellbore fluid; and
selectively removing the second removable member.

57. A method of using a composite downhole article, comprising:
forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a plurality of nested balls, ball seats, plugs, plug seats, disks, darts, sleeves, or tubular sections
using the article to perform a first wellbore operation;
exposing the article to the wellbore fluid; and
selectively removing the second removable member.

58. A method of using a composite downhole article, comprising:
forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the composite downhole article comprises a portion of a tubular section and is selectively removable or reconfigurable to define a feature in the tubular section
using the article to perform a first wellbore operation;
exposing the article to the wellbore fluid; and
selectively removing the second removable member.

59. The method of claim 58, wherein the feature comprises a through-hole, opening, blind hole, blind opening, conduit, passage, groove, protruding rib, or shoulder.

60. A method of using a composite downhole article, comprising:
forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the powder compact further comprises a plurality of second powder particles.

61. A method of using a composite downhole article, comprising:
forming a composite downhole article that comprises a first member comprising a first material that is removable in a wellbore fluid at a first removal rate, and a second removable member disposed on the first member comprising a second material that is removable in the wellbore fluid at a second removal rate, the second material comprising a powder compact that comprises a plurality of metallic coated powder particles, wherein the second removal rate is substantially greater than the first removal rate, and wherein the first wellbore operation comprises partially or completely closing an orifice in a wellbore as part of a fracturing, completion or production operation.

* * * * *